(12) United States Patent
Sohma

(10) Patent No.: US 11,412,096 B2
(45) Date of Patent: Aug. 9, 2022

(54) IMAGE FORMING APPARATUS CAPABLE OF COMMUNICATING WITH A BLOCKCHAIN SERVICE, CONTROL METHOD, AND STORAGE MEDIUM

(71) Applicant: CANON KABUSHIKI KAISHA, Tokyo (JP)

(72) Inventor: Hidetomo Sohma, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/147,292

(22) Filed: Jan. 12, 2021

(65) Prior Publication Data
US 2021/0243329 A1    Aug. 5, 2021

(30) Foreign Application Priority Data

Jan. 30, 2020 (JP) .............................. JP2020-014210

(51) Int. Cl.
*H04N 1/00* (2006.01)
*H04N 1/32* (2006.01)

(52) U.S. Cl.
CPC ..... *H04N 1/00344* (2013.01); *H04N 1/00114* (2013.01); *H04N 1/00408* (2013.01); *H04N 1/00856* (2013.01); *H04N 1/32021* (2013.01); *H04N 1/32101* (2013.01); *H04N 1/32625* (2013.01); *H04N 2201/0094* (2013.01); *H04N 2201/3226* (2013.01)

(58) Field of Classification Search
CPC ........... H04N 1/00344; H04N 1/32101; H04N 1/00408; H04N 1/00856; H04N 2201/3226; H04N 2201/0094
See application file for complete search history.

(56) References Cited

U.S. PATENT DOCUMENTS

| | | | | |
|---|---|---|---|---|
| 10,771,639 | B1* | 9/2020 | Kosaka | G06F 3/1267 |
| 2002/0021902 | A1* | 2/2002 | Hosoda | H04N 1/00567 396/429 |
| 2002/0054350 | A1* | 5/2002 | Kakigi | H04N 1/00681 358/1.16 |
| 2010/0245893 | A1* | 9/2010 | Kawata | H04L 61/2092 358/1.15 |
| 2014/0043629 | A1* | 2/2014 | Shirado | G06K 15/4095 358/1.9 |
| 2015/0199656 | A1* | 7/2015 | Carey | G06Q 10/20 358/1.15 |

(Continued)

FOREIGN PATENT DOCUMENTS

JP        2016081134 A        5/2016

*Primary Examiner* — Nicholas Pachol
(74) *Attorney, Agent, or Firm* — Canon U.S.A., Inc. IP Division

(57) ABSTRACT

In an image forming apparatus that cooperates with a management service and a blockchain service, the management service receiving a document via a network and storing the document, and the blockchain service managing information on the document in block units, defining a relation between each of a plurality of blocks and blocks before and/or after the block, and managing the plurality of blocks using a plurality of nodes. In a case where an error occurs during printing of the document, new information to be registered in response to completion of the printing of the document is not registered in the blockchain service, the printing is stopped, and an error process is performed.

13 Claims, 18 Drawing Sheets

(56) References Cited

U.S. PATENT DOCUMENTS

| | | | |
|---|---|---|---|
| 2015/0222769 A1* | 8/2015 | Hino | H04N 1/00411 |
| | | | 358/1.15 |
| 2016/0253126 A1* | 9/2016 | Kamma | G06F 3/1292 |
| | | | 358/1.15 |
| 2017/0180569 A1* | 6/2017 | Suzuki | H04N 1/00344 |
| 2017/0329996 A1* | 11/2017 | Wilson | G06F 21/64 |
| 2018/0255186 A1* | 9/2018 | Takeo | G06F 3/1273 |
| 2018/0267753 A1* | 9/2018 | Asakimori | G06F 3/1256 |
| 2019/0171849 A1* | 6/2019 | Assenmacher | G06F 21/64 |
| 2020/0162627 A1* | 5/2020 | Utoh | H04N 1/00209 |
| 2020/0341702 A1* | 10/2020 | Kosaka | G06F 3/1222 |
| 2021/0019432 A1* | 1/2021 | Sato | H04N 1/4413 |

\* cited by examiner

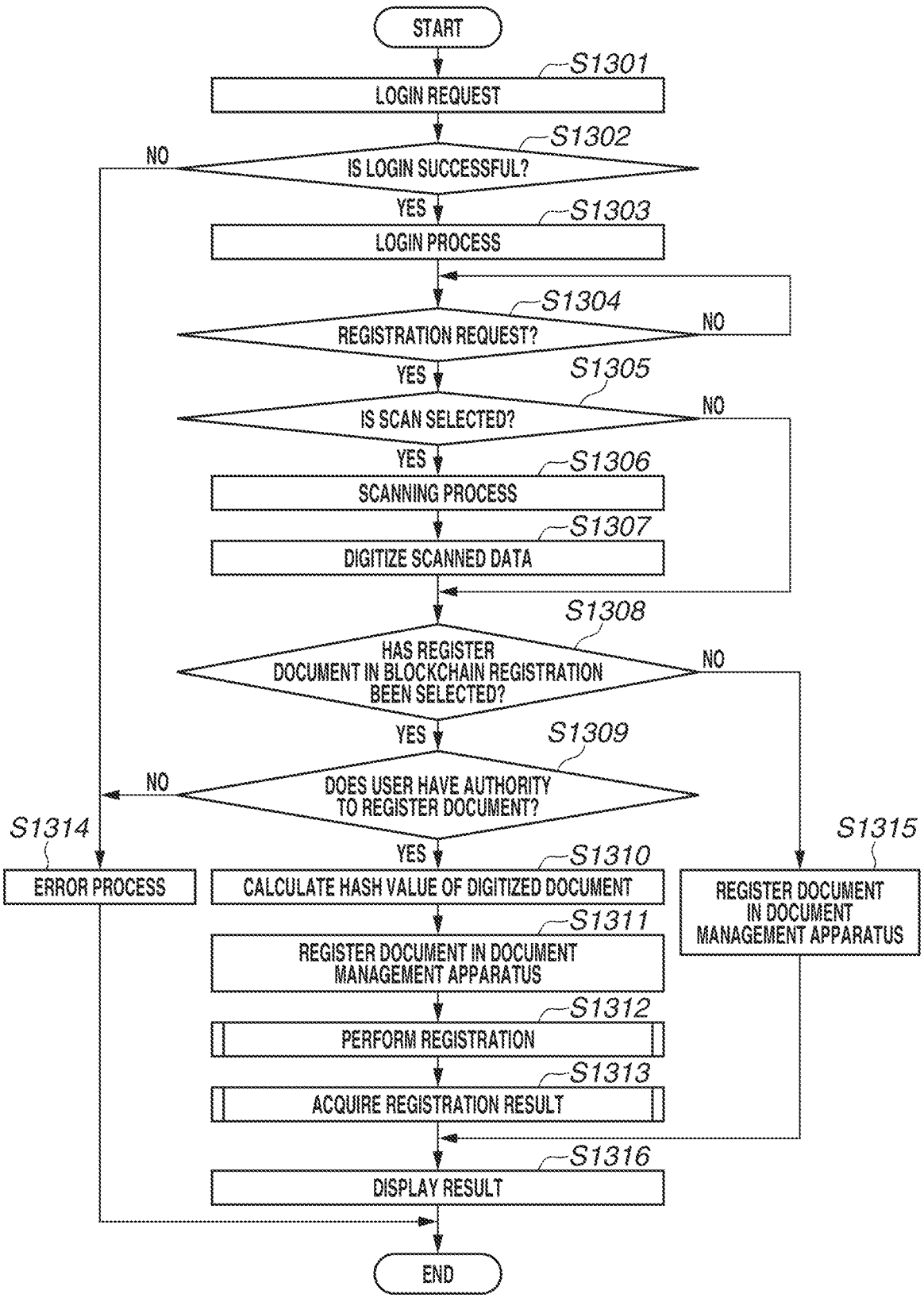

IMAGE FORMING APPARATUS CAPABLE OF COMMUNICATING WITH A BLOCKCHAIN SERVICE, CONTROL METHOD, AND STORAGE MEDIUM

BACKGROUND

Field

The present disclosure relates to an image forming apparatus for detecting the falsification of the record of a digitized document using a blockchain.

Description of the Related Art

While important documents, such as official documents and managerial documents, are held by respective countries and companies, falsification of important documents has been an issue. A mechanism for preventing a document from being falsified or for detecting the falsification of a document is required. As a generally known method discussed in Japanese Patent Application Laid-Open No. 2016-81134, a document management apparatus having a function of digitizing a document file, storing the digitized document file, and recording an operation on the stored document file (when and who has performed what operation) is used.

SUMMARY OF THE INVENTION

According to an aspect of the present disclosure, an image forming apparatus that cooperates with a management service and a blockchain service, the management service receiving a document via a network and storing the document, the blockchain service managing information on the document in block units, defining a relation between each of a plurality of blocks and blocks before and/or after the block, and managing the plurality of blocks using a plurality of nodes, the image forming apparatus including a printer, one or more memories storing instructions, and one or more processors that, upon execution of the instructions, configures the one or more processors to act as a printing unit to cause the printer to print the document received from the management service based on confirming that the information on the document stored in the management service has been registered in the blockchain service, wherein in a case where an error occurs during the printing of the document, new information to be registered in response to completion of the printing of the document is not registered in the blockchain service, the printing is stopped, and an error process is performed.

Further features will become apparent from the following description of exemplary embodiments with reference to the attached drawings.

BRIEF DESCRIPTION OF THE DRAWINGS

FIG. 13 is a flowchart illustrating a process of registering information on a document in the blockchain apparatus.

DESCRIPTION OF THE EMBODIMENTS

It is not always possible to prevent malicious fraud, such as forcibly replacing a document file in a document management apparatus and deleting a particular operation. While a blockchain may be a solution to enable verification that a registered document is in a proper state, consideration is not given to control of the image forming apparatus in a case where a failed print product is produced due to an error in printing.

The present disclosure is directed to a method for, in a case where a failed print product is produced due to an error in printing, performing control not to register information on the failed print product as normal information.

With reference to the drawings, exemplary embodiments for carrying out the present invention will be described below.

Figure 1:
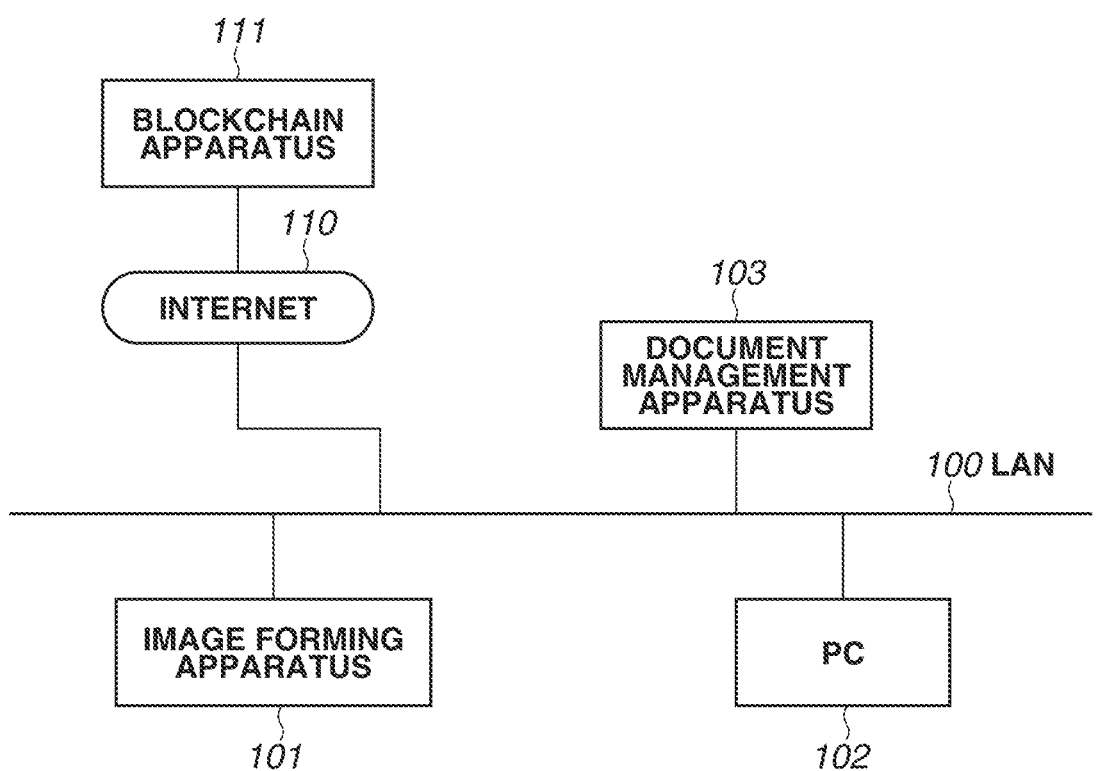
FIG. 1 is a diagram illustrating a configuration of a system.

FIG. 1 is a diagram illustrating an entire system related to an image forming apparatus 101. The image forming apparatus 101, a personal computer (PC) 102, and a document management apparatus 103 are connected to a local area network (LAN) 100 in an intranet and communicate with a blockchain apparatus 111 via the Internet 110. The PC 102 is used to manage the image forming apparatus 101 using a web browser and perform printing from the image forming apparatus 101 using a print driver.

The blockchain apparatus 111 cooperates with the image forming apparatus 101 or the PC 102, whereby information on a generated document can be collectively managed in block units. The blockchain apparatus 111 is thus used to guarantee the validity of a document. While the blockchain apparatus 111 is illustrated as a single apparatus, the blockchain apparatus 111 includes a plurality of information processing apparatuses, so called nodes, and is a system group that provides a blockchain service. The document management apparatus 103 is an apparatus that saves a digitized document generated by the image forming apparatus 101 or the PC 102. The document management apparatus 103 provides a management service.

Figure 2:
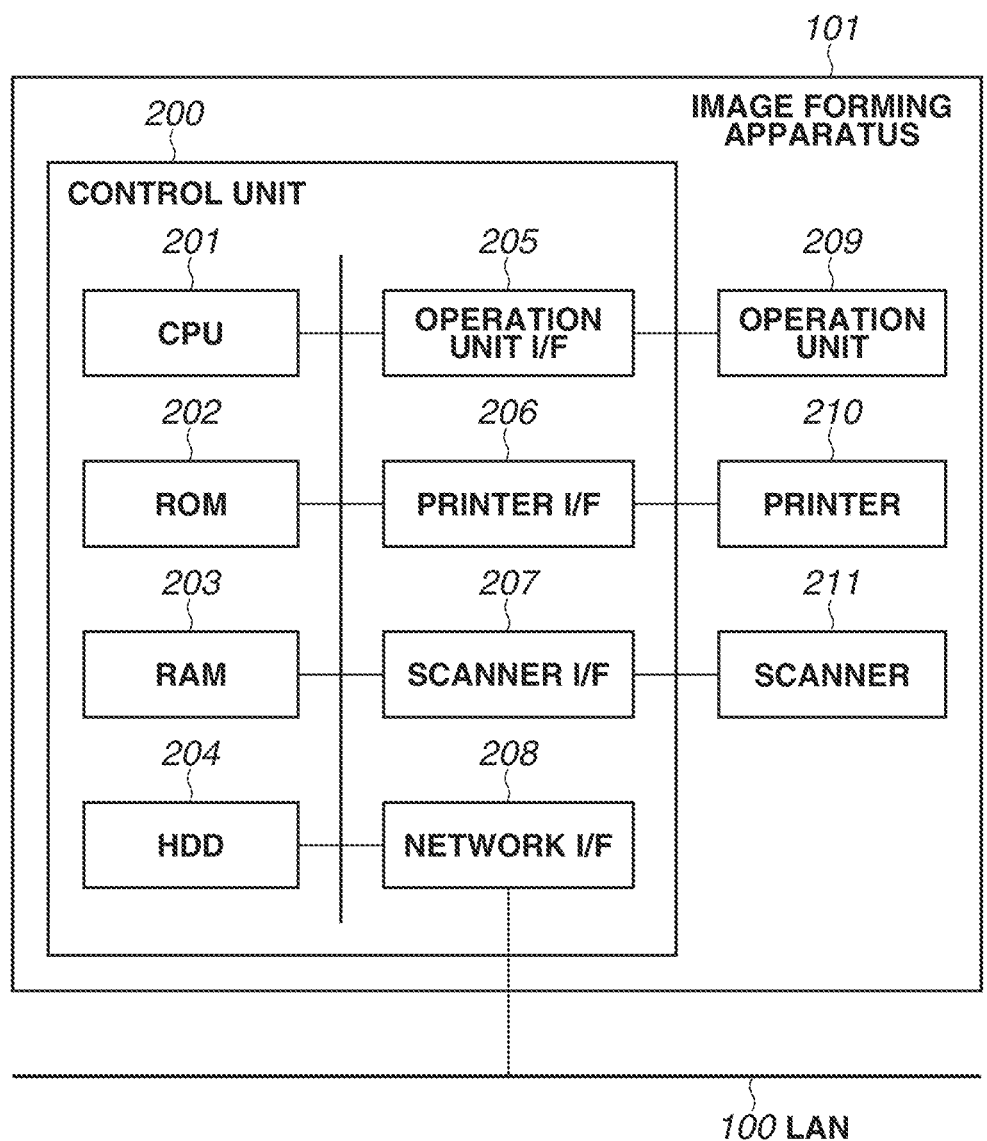
FIG. 2 is a diagram illustrating a hardware configuration of an image forming apparatus.

FIG. 2 is a block diagram illustrating the hardware configuration of the image forming apparatus 101. A control unit 200 including a central processing unit (CPU) 201 controls the entire operation of the image forming apparatus 101. The CPU 201 reads a control program stored in a read-only memory (ROM) 202 and performs various types of control, such as reading control and transmission control.

A random-access memory (RAM) 203 is used as a temporary storage area such as a main memory or a work area for the CPU 201. A hard disk drive (HDD) 204 stores image data and various programs described below. An operation unit interface (I/F) 205 connects an operation unit 209 and the control unit 200.

A printer I/F 206 connects a printer 210 and the control unit 200. Image data that is to be printed by the printer 210 is transferred from the control unit 200 to the printer 210 via the printer I/F 206 and printed on a recording medium by the printer 210.

A scanner I/F 207 connects a scanner 211 and the control unit 200. The scanner 211 reads an image on a document, to generate image data. Then, the scanner 211 inputs the image data to the control unit 200 via the scanner I/F 207. A network I/F 208 connects the control unit 200 (the image forming apparatus 101) to the LAN 100. The network I/F 208 transmits image data and information to an external apparatus on the LAN 100 and receives various pieces of information from the external apparatus on the LAN 100.

Figure 3:
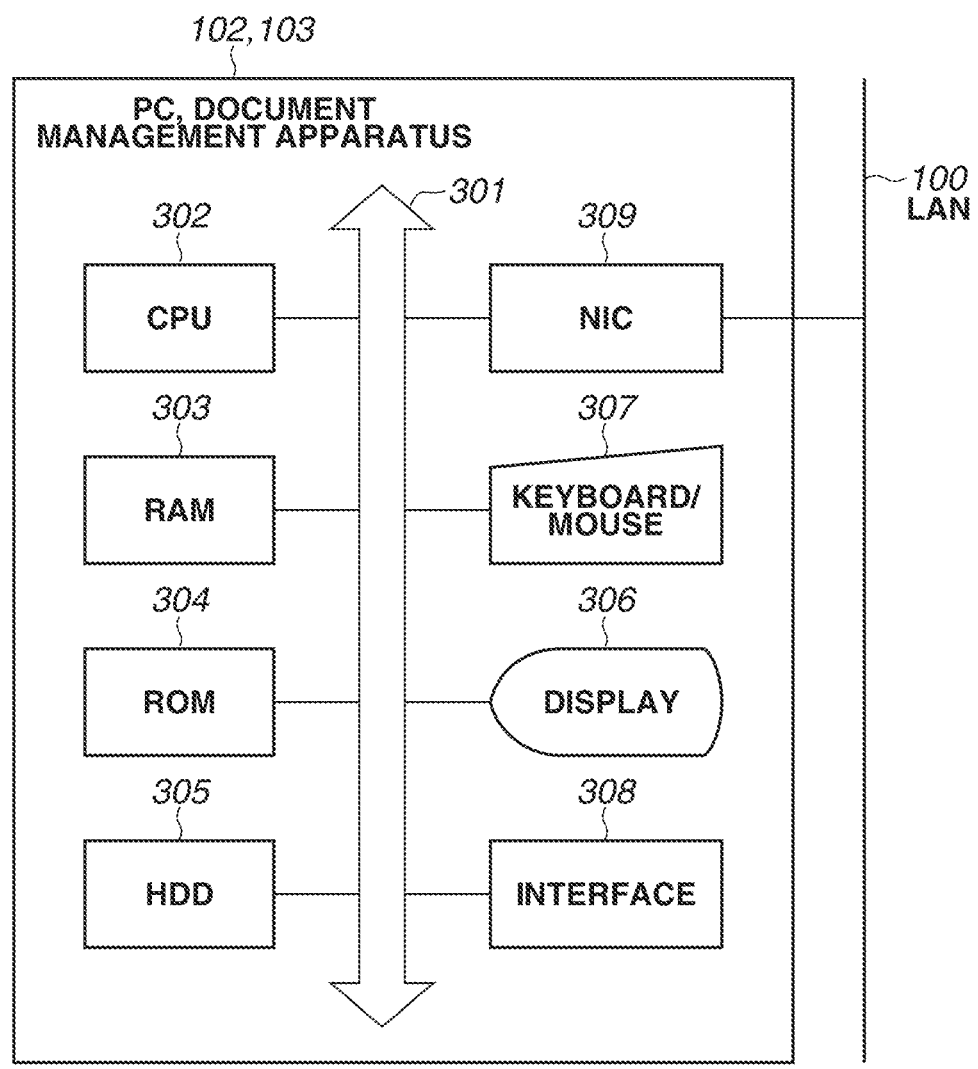
FIG. 3 is a diagram illustrating a hardware configuration of a personal computer (PC) and a document management apparatus.

FIG. 3 is a block diagram illustrating the hardware configuration of the computer of each of the PC 102 and the document management apparatus 103. A CPU 302 controls the entire apparatus. The CPU 302 performs control to execute an application program and an operating system (OS) stored in an HDD 305 and temporarily store information and a file necessary to execute the programs in a RAM 303.

A ROM 304 is a storage unit and stores various types of data of a basic input/output (I/O) program and the like. The RAM 303 is a temporary storage unit and functions as a main memory or a work area for the CPU 302. The HDD 305 is one of external storage units. The HDD 305 functions as a large-capacity memory and stores application programs, such as an office application and a web browser, an OS, and related programs.

A display 306 is a display unit and displays, for example, a command input via a keyboard/mouse 307 as an instruction input unit. An interface 308 is an external device I/F and connects to a printer, a Universal Serial Bus (USB) device, and a peripheral device. A system bus 301 governs the flow of data in the apparatus. A network interface card (hereinafter "NIC") 309 exchanges data with an external device via the LAN 100. The above configuration of the computer is merely illustrative, and is not limited to the exemplary configuration in FIG. 3.

For example, the storage locations for data and a program can be changed among the ROM 304, the RAM 303, and the HDD 305 according to the features of the data and the program. In the present exemplary embodiment, unless otherwise stated, various processes are achieved by loading a program stored in the ROM 304 into the RAM 303 and by the CPU 302 executing the program.

Figure 4:
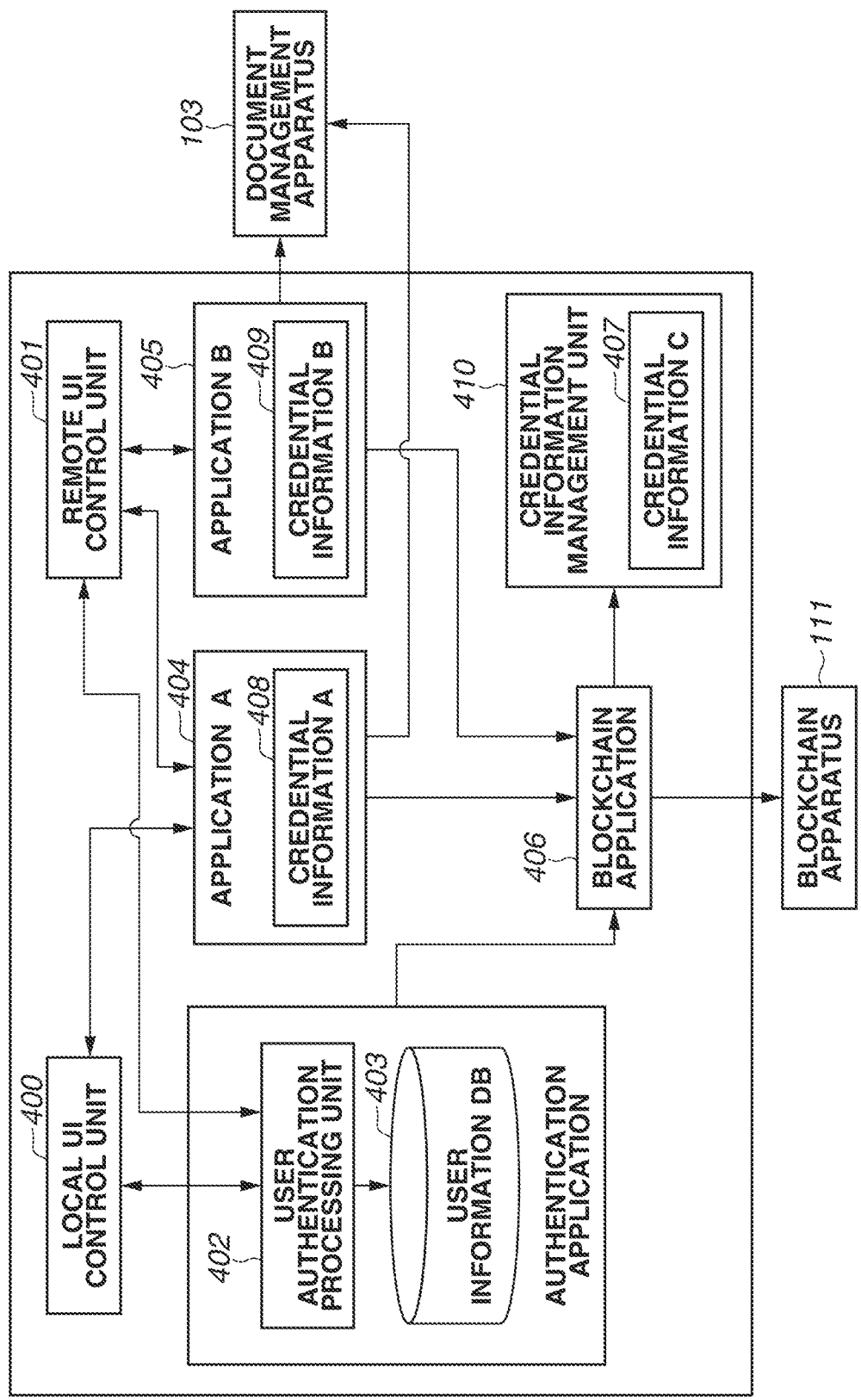
FIG. 4 is a diagram illustrating a software configuration of the image forming apparatus.

FIG. 4 is a block diagram illustrating the software configuration of the image forming apparatus 101 according to the present invention. Unless otherwise noted, each processing unit is a software function achieved by executing a program stored in the ROM 202.

A local user interface (UI) control unit 400 provides the function of controlling the operation unit 209 via the operation unit I/F 205. The local UI control unit 400 notifies a user authentication processing unit 402 and an application of the content of an operation performed on the operation unit 209 by a user. The local UI control unit 400 displays a function selection screen 900 on the operation unit 209.

Figure 9A:
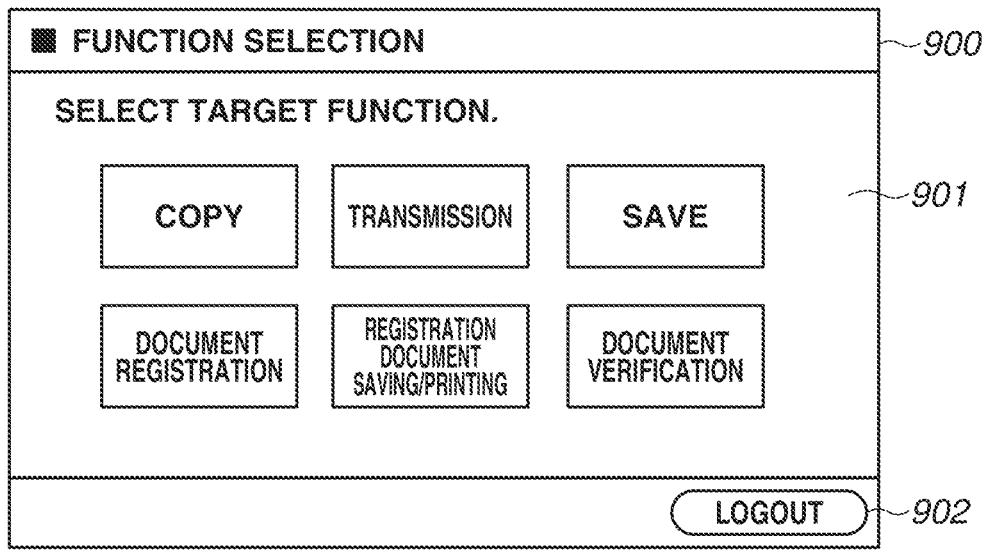
FIGS. 9A and 9B are diagrams illustrating examples of function selection screens.

FIG. 9A illustrates an example of the function selection screen 900. The local UI control unit 400 receives a screen display request from the user authentication processing unit 402 or an application and performs control to display the screen on the operation unit 209. Unless otherwise noted, the user authentication processing unit 402 and an application A 404 display the screen on the operation unit 209 via the local UI control unit 400.

A remote UI control unit 401 provides a web page to the web browser on the PC 102 via the network I/F 208. The remote UI control unit 401 notifies the user authentication processing unit 402 or an application of the content of an operation performed on the web browser by the user. The remote UI control unit 401 displays a function selection screen 910 in the web browser on the PC 102.

Figure 9B:
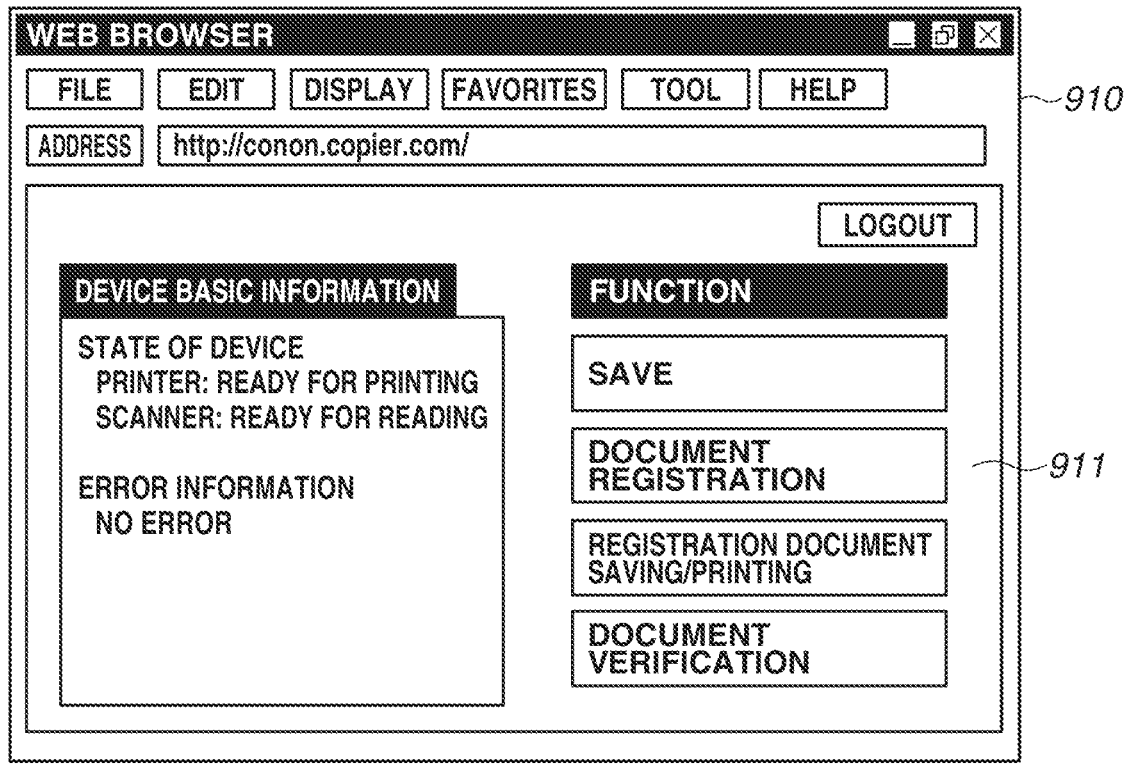

FIG. 9B illustrates an example of the function selection screen 910. The remote UI control unit 401 receives a request from the user authentication processing unit 402 or an application and performs control to display the web page in the web browser. Unless otherwise noted, the user authentication processing unit 402, the application A 404, and an application B 405 display the web page in the web browser via the remote UI control unit 401.

Figure 7A:
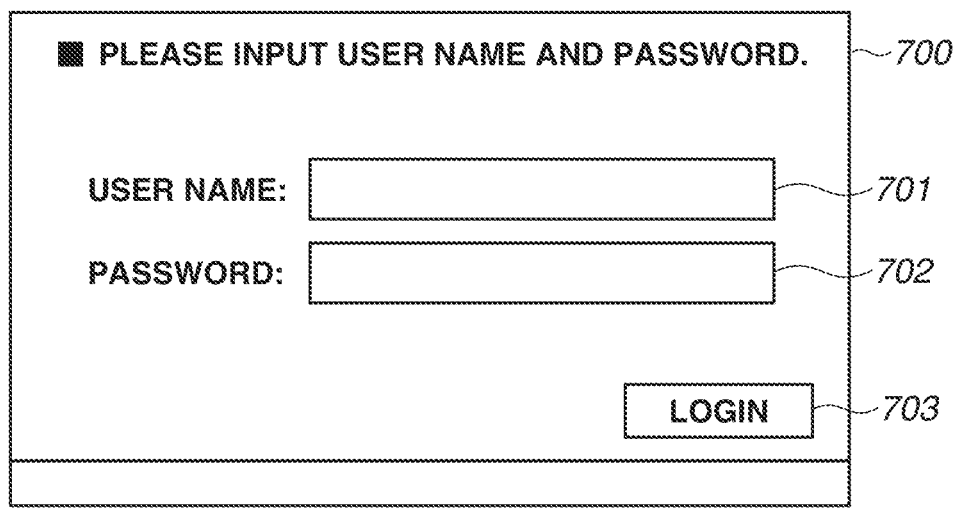
FIGS. 7A and 7B are diagrams illustrating examples of authentication screens.
Figure 7B:
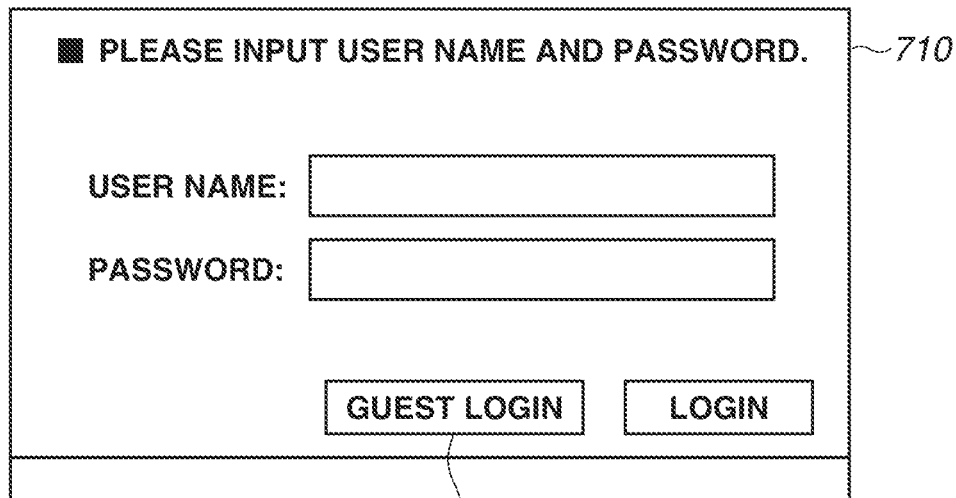

The user authentication processing unit 402 provides the function of authenticating the user who uses the image forming apparatus 101. Thus, the user authentication processing unit 402 displays an authentication screen 700 (examples of the screen are illustrated in FIGS. 7A and 7B) on the operation unit 209. The user authentication processing unit 402 receives inputs of a user name and a password from the user via the authentication screen 700 and compares the user name and the password with user information held in a user information database (DB) 403, to authenticate the user.

The user information DB 403 provides the function of holding user information that is information on the user who uses the image forming apparatus 101. The user information DB 403 is constructed in the HDD 204, and information stored in the user information DB 403 is therefore stored in the HDD 204. Tables 1 and 2 illustrate examples of the information stored in the user information DB 403.

TABLE 1

User Information Table

| User Name | Password | Role |
|---|---|---|
| User A | **** | Administrator |
| User B | **** | General User |
| Guest | — | Guest User |

A user information table in table 1 includes "user name", "password", and "role". "User name" is a name for uniquely identifying the user. "Password" is a password that is used to authenticate the user and any value can be set with respect to each user. "Role" is the name of a role that is authority to be given to the user of the image forming apparatus 101. In the present exemplary embodiment, "role" includes three types, namely "administrator", "general user", and "guest user".

"Administrator" is a role that is assigned to an administrator user of the image forming apparatus 101. "General User" is a role that is assigned to a general user who uses the image forming apparatus 101. "Guest user" is a role that is assigned to a user for whom an available function is restricted. According to the value of "role" of the user having logged in, a function can be limited with respect to each role.

TABLE 2

Role Information Table

| Role | Copy | Transmission | Saving | BC Registration | BC Saving/ Printing | BC Verification |
| --- | --- | --- | --- | --- | --- | --- |
| Administrator | Permitted | Permitted | Permitted | Permitted | Permitted | Permitted |
| General User | Permitted | Prohibited | Permitted | Permitted | Permitted | Permitted |
| Guest User | Permitted | Prohibited | Prohibited | Prohibited | Prohibited | Permitted |

A role information table in table 2 includes "role", "copy", "transmission", "saving", "BC registration", "BC saving/printing", and "BC verification". "Role" is the name of a role that is authority to be given to the user. "Copy", "transmission", "saving", "BC registration", "BC saving/printing", and "BC verification" indicate respective functions included in the image forming apparatus 101, and the value of each function indicates whether each role is permitted to use the function or prohibited from using the function.

"Copy", "transmission", and "saving" indicate authority to use a copy function, the function of transmitting a scanned document to the PC 102, and the function of saving a digitized scanned document in the HDD 204, respectively. "BC registration" indicates authority to use the function of registering information on a document in the blockchain apparatus 111. "BC saving/printing" indicates authority to use the function of saving a document that is saved in the document management apparatus 103 and associated with document information registered in the blockchain apparatus 111, in the image forming apparatus 101 and printing the document.

"BC verification" indicates authority to use the function of verifying whether a document read by the scanner 211 or a document saved in the management service is a formal document, based on document information registered in the blockchain apparatus 111. According to the authority of "role" in the role information table corresponding the role of the logged-in user, an application of the image forming apparatus 101 restricts each function.

The application A 404 provides the function of converting a scanned document into a digitized document and registering information on the document in the blockchain apparatus 111 via a blockchain application 406 and registering the document in the document management apparatus 103. The application A 404 controls the scanner 211 via the scanner I/F 207 and transmits data to the LAN 100 via the network I/F 208, to transmit scan data to an external apparatus.

The application A 404 receives an input to a screen displayed on the operation unit 209 via the local UI control unit 400 and performs processing according to the input. The application A 404 displays a registration screen 1000, a registration document saving/printing screen 1100, and a document verification screen 1200 on the operation unit 209.

Figure 10A:
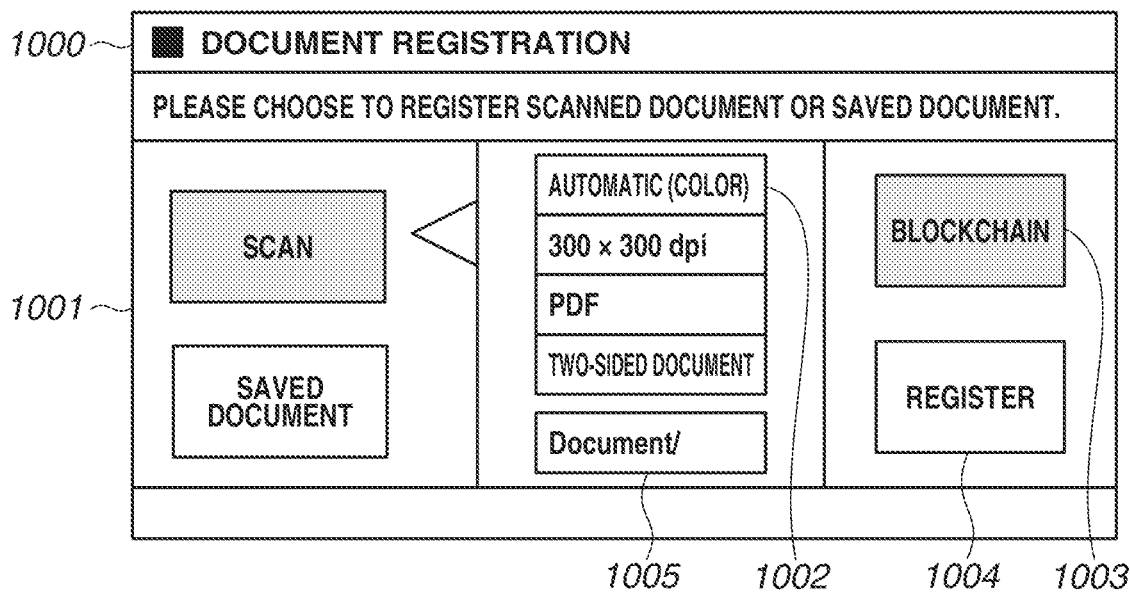
FIGS. 10A, 10B, 10C, and 10D are diagrams illustrating examples of document registration screens of an application A.
Figure 10C:
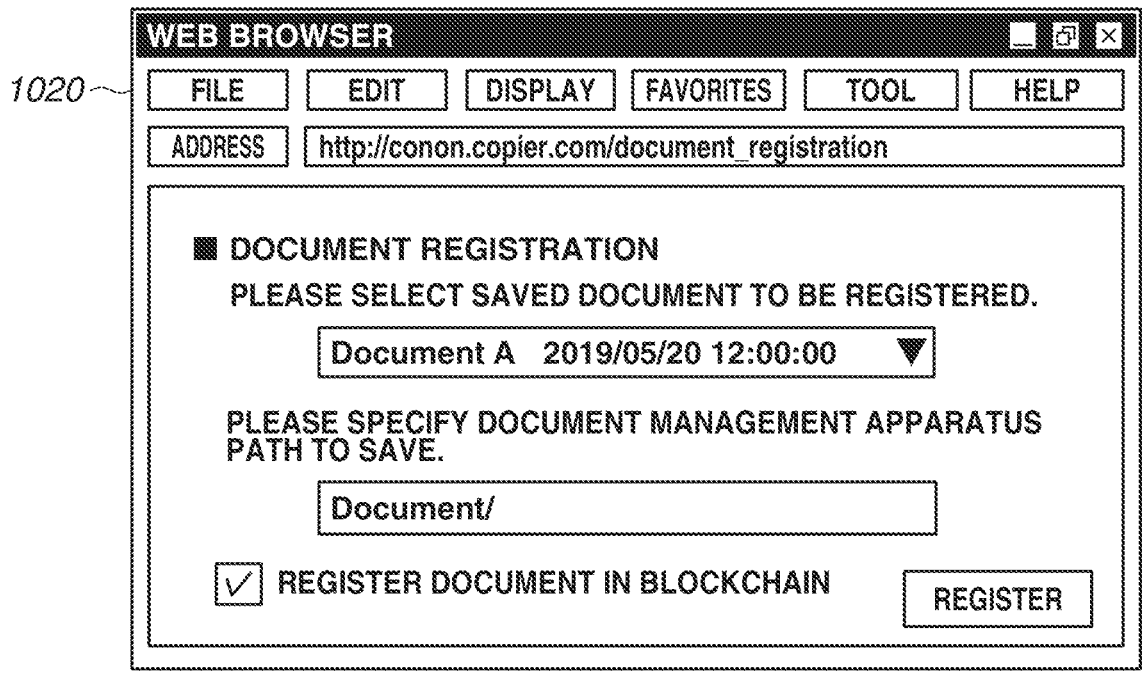
Figure 11A:
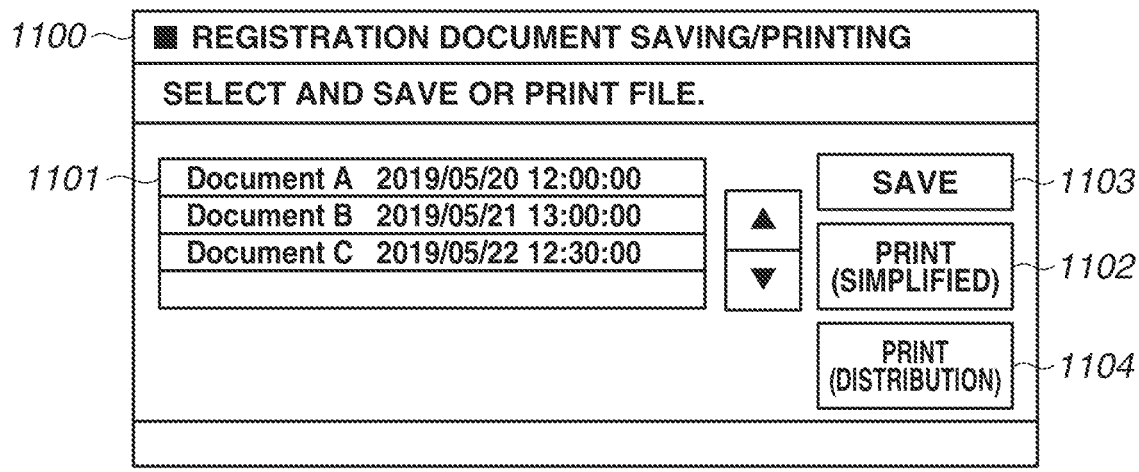
FIGS. 11A and 11B are diagrams illustrating examples of registration document saving/printing screens of the application A.
Figure 11B:
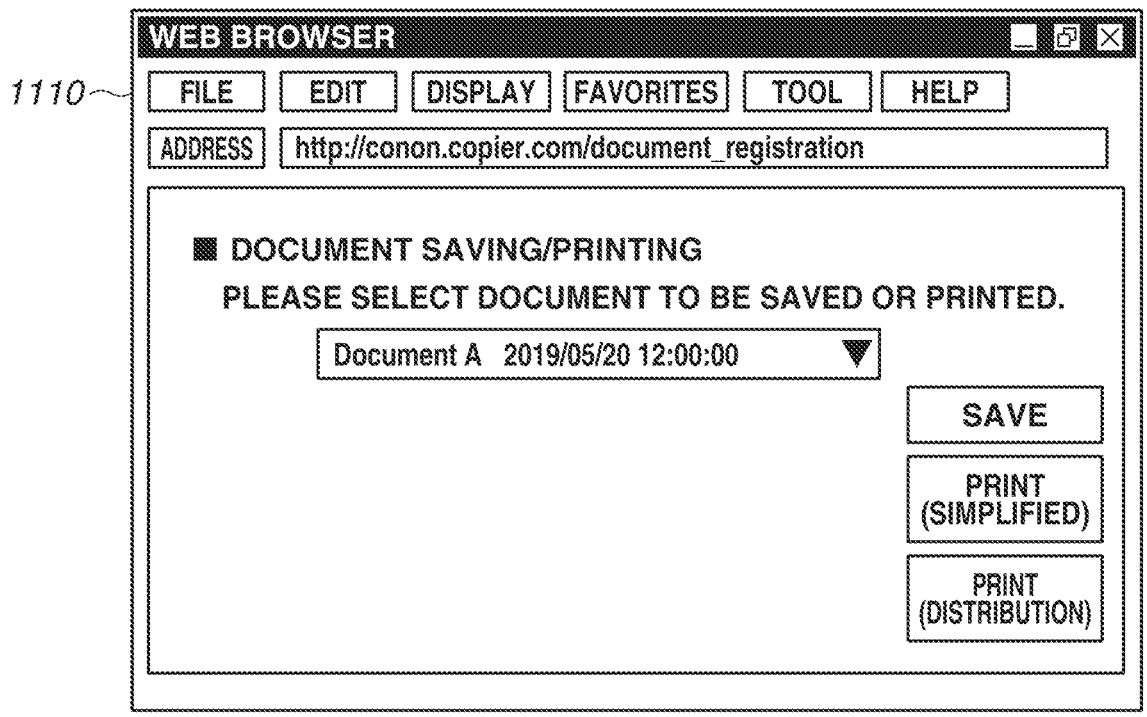
Figure 12A:
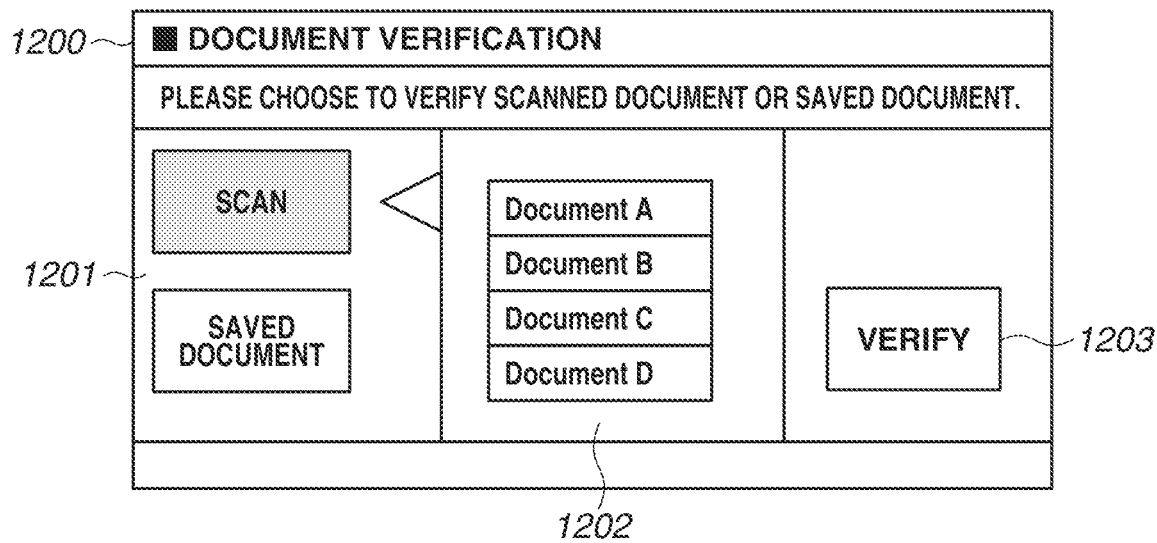
FIGS. 12A and 12B are diagrams illustrating examples of registration document verification screens of the application A.
Figure 12B:
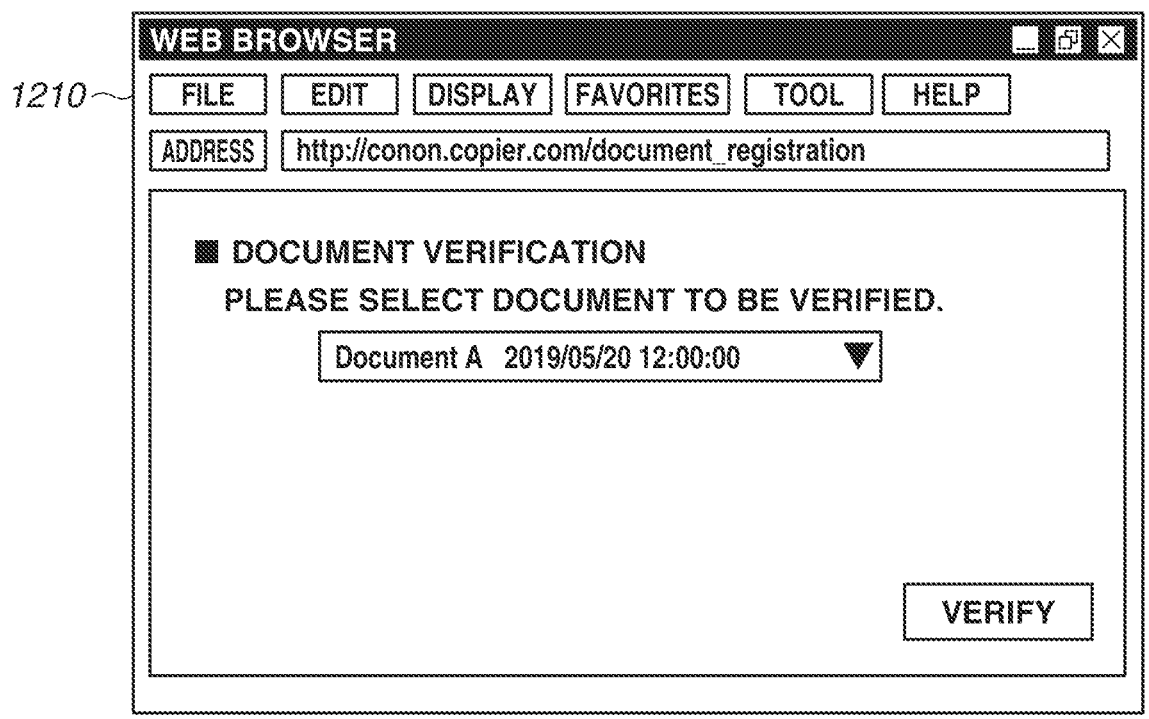

FIG. 10A illustrates an example of the registration screen 1000. FIG. 11A illustrates an example of the registration document saving/printing screen 1100. FIG. 12A illustrates an example of the document verification screen 1200. The application A 404 receives an input from the web browser on the PC 102 via the remote UI control unit 401 and performs processing according to the input. The application A 404 displays a registration screen 1020, a registration document saving/printing screen 1110, and a document verification screen 1210 in the web browser on the PC 102. FIG. 10C illustrates an example of the registration screen 1020. FIG. 11B illustrates an example of the registration document saving/printing screen 1110. FIG. 12B illustrates an example of the document verification screen 1210.

Similarly to the application A 404, the application B 405 provides the function of converting a scanned document into a digitized document and registering document information on the document in the blockchain apparatus 111 via the blockchain application 406 and registering the document in the document management apparatus 103. The application B 405 is different from the application A 404 in that the application A 404 handles inputs to and outputs from both a local UI and a remote UI via the local UI control unit 400 and the remote UI control unit 401, respectively, but the application B 405 handles an input to and an output from only the remote UI.

Figure 6:
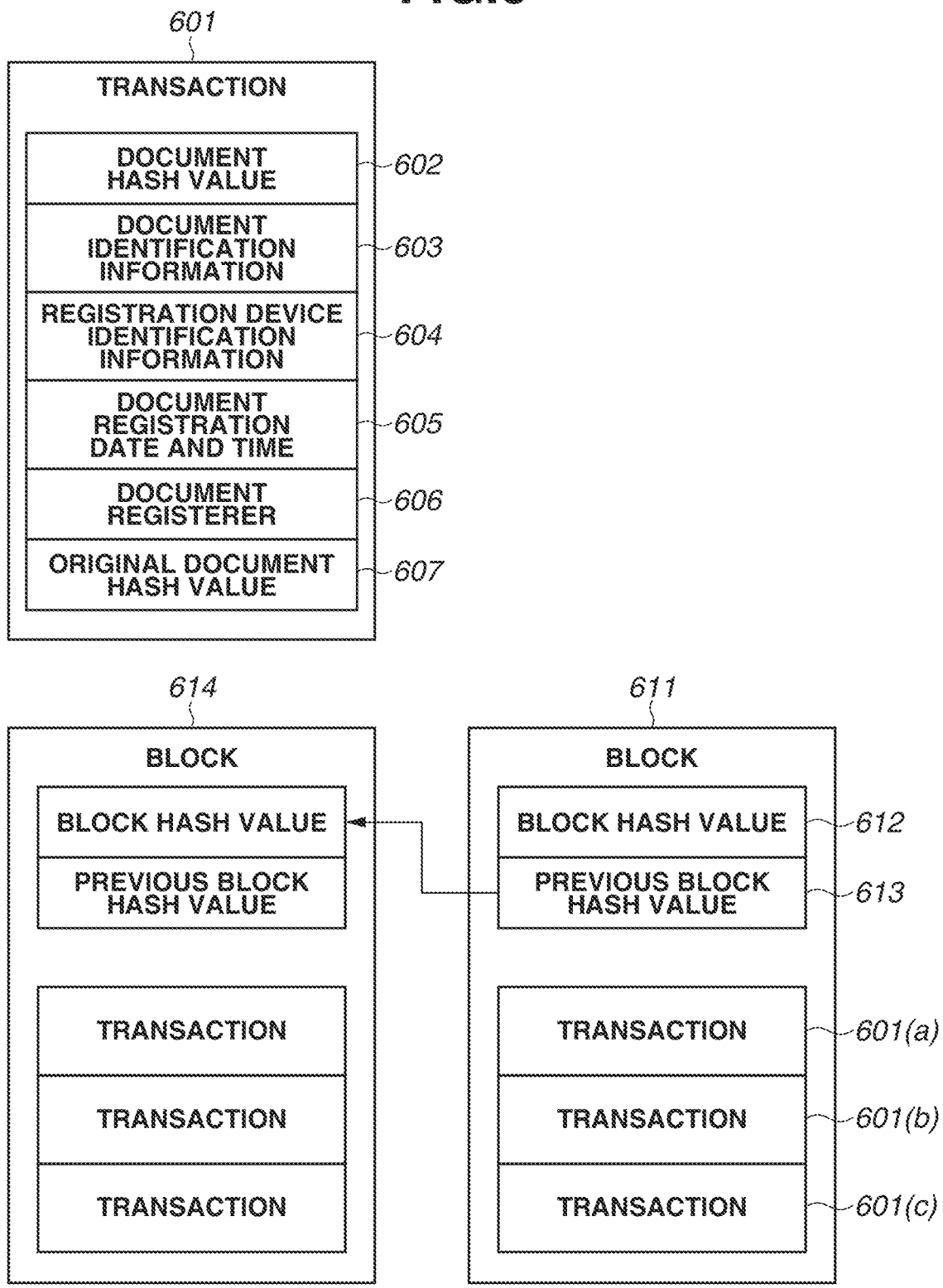
FIG. 6 is a diagram illustrating a data configuration of a blockchain apparatus.

The blockchain application 406 provides the function of receiving an instruction from the application A 404 or the application B 405 and registering information on a document in the blockchain apparatus 111, acquiring information on a document from the blockchain apparatus 111, or verifying information on a document in the blockchain apparatus 111. FIG. 6 illustrates examples of the data structures of a transaction 601 that is registered in the blockchain apparatus 111 by the blockchain application 406, and blocks.

When receiving from an application an instruction to the blockchain apparatus 111, the blockchain application 406 also receives credential information from a credential information management unit 410. The blockchain application 406 verifies the received credential information, and only in a case where the verification is successful, executes processing on the blockchain apparatus 111.

Credential information A 408 guarantees that the application A 404 is a legitimate application that uses the blockchain apparatus 111. The credential information A 408 is issued to an application verified that proper processing is performed, and the application is provided in the image forming apparatus 101 in the state where the credential information A 408 is embedded in the application. The substance of the credential information A 408 may be a digital certificate, a key pair of a private key and a public key, or a data value determined in advance. The content of the credential information A 408 may differ in each application.

Credential information B 409 guarantees that the application B 405 is a legitimate application that uses the blockchain apparatus 111. Credential information C 407 guarantees that the image forming apparatus 101 is a legitimate apparatus that uses the blockchain apparatus 111. For example, the credential information C 407 may be issued on each apparatus manufacturer by an organization that administers this system. The image forming apparatus 101 may be shipped in the state where the credential information C 407 is built into the firmware of the image forming apparatus 101, or the credential information C 407 may be installed on the image forming apparatus 101 after shipment.

The credential information management unit 410 provides the function of managing credential information in the image forming apparatus 101. In the present exemplary embodiment, the credential information management unit 410 receives an instruction from the blockchain application 406 and sends the credential information C 407 to the blockchain application 406.

Figure 5:
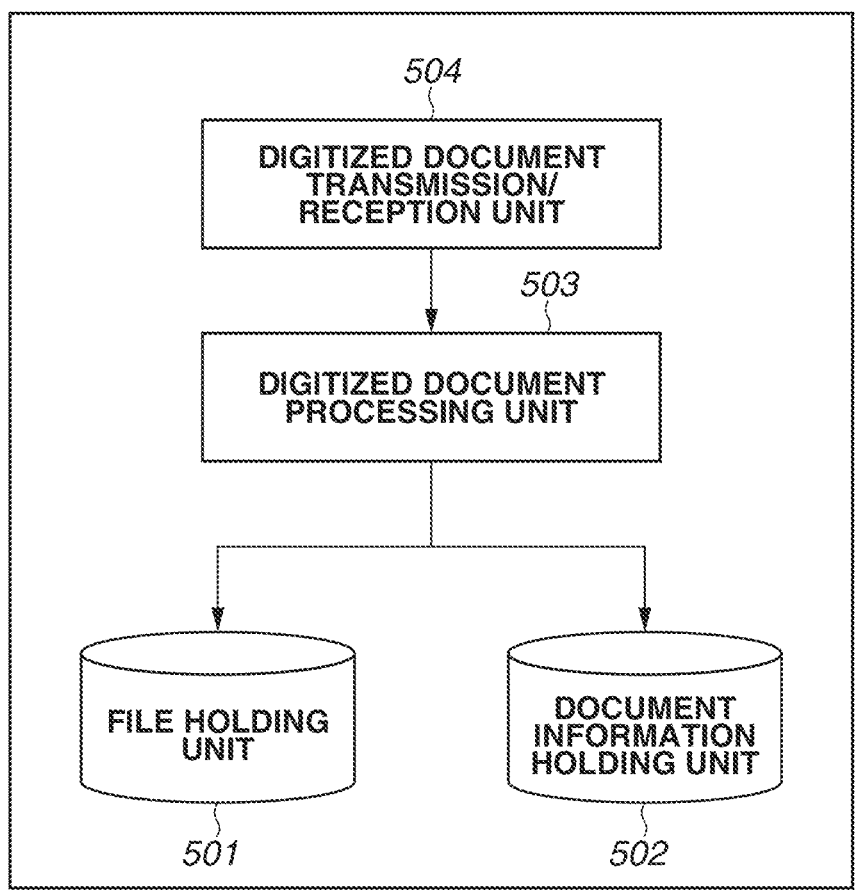
FIG. 5 is a diagram illustrating a software configuration of the document management apparatus.

FIG. 5 is a block diagram illustrating the software configuration of the document management apparatus 103 related to the present invention. A digitized document managed by the document management apparatus 103 includes a document file saved in a file holding unit 501 and information indicating the document that is saved in a document information holding unit 502. Data stored in the document information holding unit 502 is information described in a document information table in table 3.

TABLE 3

| ID | Document Name | Date and Time of Registration | File Path |
|---|---|---|---|
| 1 | Document A | 2019 May 20 12:00:00 | D:\Document\document0001.pdf |
| 2 | Document B | 2019 May 21 13:00:00 | D:\Document\document0002.pdf |
| 3 | Document C | 2019 May 22 12:30:00 | D:\Document\document0003.pdf |

The document information table in table 3 includes "ID", "document name", "date and time of registration", and "file path". "ID" is identification information for uniquely managing a digitized document. "Document name" is a name that is given to identify the digitized document. This document name may be the same among a plurality of digitized documents. "Date and time of registration" is the date and time when the digitized document is saved in the document management apparatus 103. "File path" indicates the position where a document file stored in the file holding unit 501 is saved. While, in the present exemplary embodiment, "file path" is represented as a path on a file system, "file path" may not be a path so long as "file path" is information uniquely indicating the save location. These items are illustrated to describe the present exemplary embodiment, and information for classifying a document other than these items may also be held together.

A digitized document processing unit 503 has the function of accessing the file holding unit 501 and the document information holding unit 502 and controlling the process of registering or acquiring a digitized document and the process of acquiring a list. The execution of these processes of the digitized document processing unit 503 is started by a digitized document transmission/reception unit 504 receiving a request to perform an input/output process for a digitized document from outside the document management apparatus 103, such as the image forming apparatus 101 or the PC 102.

FIG. 6 is a block diagram illustrating the data structures of the transaction 601 held in the blockchain apparatus 111, and blocks 614 and 611 where a plurality of transactions 601 is stored. The blockchain apparatus 111 is an apparatus that manages data using a method termed a blockchain. This blockchain treats information in units of transactions and manages the transactions in units of blocks where the plurality of transactions is grouped together. Each block is configured to hold relations to blocks before and after the block so that the blocks are in the chain. For example, FIG. 6 illustrates the relationship between the blocks 614 and 611 where the before-and-after relationship of them is defined.

The blockchain apparatus 111 includes a plurality of computers termed nodes and has a non-centralized apparatus structure where data in blocks managed by each of the nodes is equivalent between the nodes. If blockchain data is tried to be falsified, updating the plurality of nodes included in the blockchain apparatus 111 is required. Therefore, using a blockchain is known as a data management method highly resistant to falsification.

In the present exemplary embodiment, in a case where processing a digitized document, the image forming apparatus 101 generates a transaction that is information on the document and transmits the transaction to the blockchain apparatus 111. As a result, the information on the document is managed in block units, and therefore, the proper state of the digitized document is held. Accordingly, whether the digitized document in the document management apparatus 103 is falsified can be checked.

The transaction 601 indicating the process of registering a digitized document in the document management apparatus 103 or outputting the digitized document to the document management apparatus 103 has the following six pieces of information. A document hash value 602 is a hash value calculated to uniquely represent a target digitized document. The document hash value 602 is calculated from an entire file of a document file, and the calculated hash value varies by a change in the digitized document. The document hash value 602, however, does not restrict the use of another calculation method.

Document identification information 603 is information held to associate the information with a digitized document managed by the document management apparatus 103, and in the present exemplary embodiment, stores the value of "ID" in table 3. Registration device identification information 604 is information identifying the image forming apparatus 101 having registered the document, and in the present exemplary embodiment, stores the hash value of the credential information C 407. Document registration date and time 605 is information indicating the time when the document is registered. In the present exemplary embodiment, the document registration date and time 605 stores the value of "date and time of registration" in table 3.

A document registerer 606 is information indicating a user having registered the document, and in the present exemplary embodiment, stores the hash value of the user name of the user having logged into the image forming apparatus 101. Since information, such as a user name, already registered to use the image forming apparatus 101 can be used as it is as information to be registered in the blockchain apparatus 111, it is possible to reduce the management workload of the administrator of the system.

An original document hash value 607 is information indicating the relation between documents. The original document hash value 607 is used to associate a digitized document stored in the document management apparatus 103 with an original digitized document when the stored digitized document is printed or saved as digitized data.

Next, with reference to the block 611, a description is given of the structure of a block holding the transaction 601. The block 611 is a schematic block having a general blockchain structure.

The block 611 holds a plurality of transactions 601(*a*) to 601(*c*) and a block hash value 612 calculated from these transactions 601. In the present exemplary embodiment, the number of transactions 601 included in the block 611 is three, but the number of transactions is not limited. The block 611 also holds a previous block hash value 613 for linking blocks. In the present exemplary embodiment, a block hash value of the block 614 is stored as the previous block hash value 613, and the blocks 614 and 611 are related to each other.

FIGS. 7A and 7B illustrate examples of authentication screens. The authentication screen 700 in FIG. 7A is a screen for providing the function of authenticating the user so that the user uses the functions of the image forming apparatus 101. A user name entry field 701 is a field to which the user of the image forming apparatus 101 inputs a user name. A password entry field 702 is a field to which the user of the image forming apparatus 101 inputs a password. A "login" button 703 is a button for authenticating the user. In a case where the user presses the "login" button 703, the user authentication processing unit 402 authenticates the user based on the values input to the user name entry field 701 and the password entry field 702.

An authentication screen (guest login) 710 in FIG. 7B is an example of an authentication screen where a guest login is provided. The authentication screen 710 is a screen for providing the function of authenticating the user so that the user uses the functions of the image forming apparatus 101. Only the differences from the authentication screen 700 are described below. A "guest login" button 711 is a button for authenticating the user as a guest user. In a case where the user presses this button, the user authentication processing unit 402 permits the user to log in, without authenticating the user based on the user name and the password. The user having logged in by pressing the "guest login" button 711 is assigned the user name "guest" and the role "guest user", and an available function is restricted according to the authority in the role information table in table 2. Although the details are omitted in the present exemplary embodiment, a screen to be displayed may be switched between the authentication screen 700 and the authentication screen (guest login) 710 according to the setting of the user authentication processing unit 402.

Figure 8A:
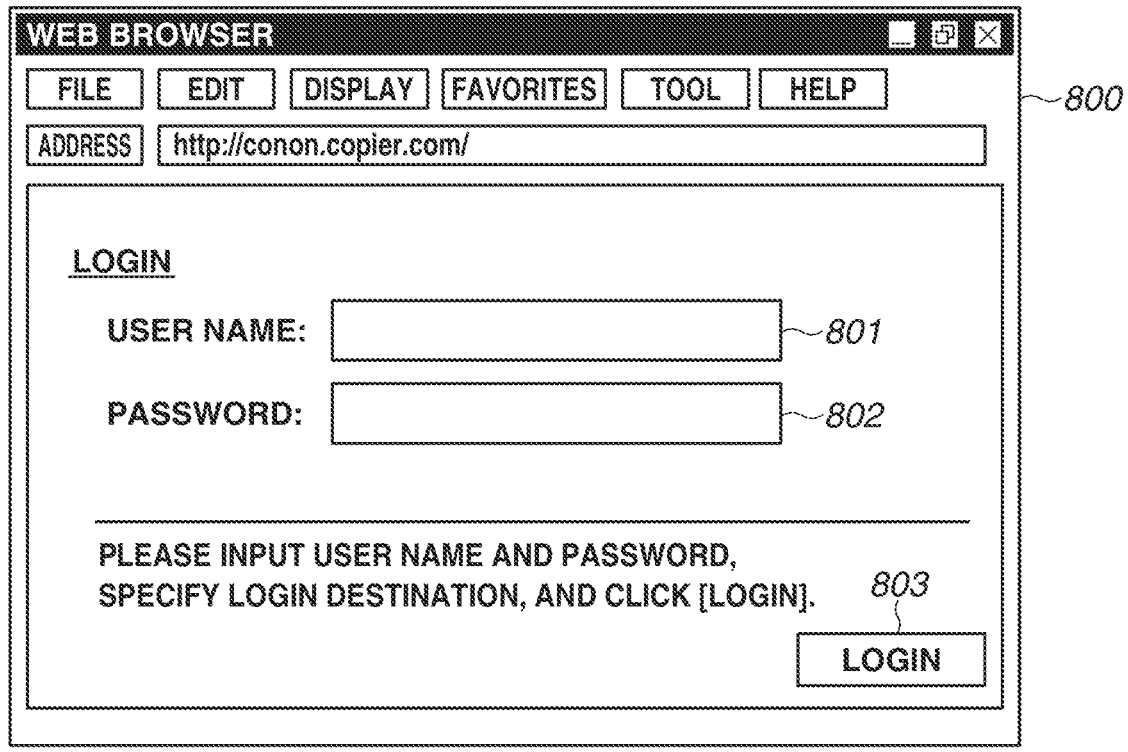
FIGS. 8A and 8B are diagrams illustrating examples of remote authentication screens.
Figure 8B:
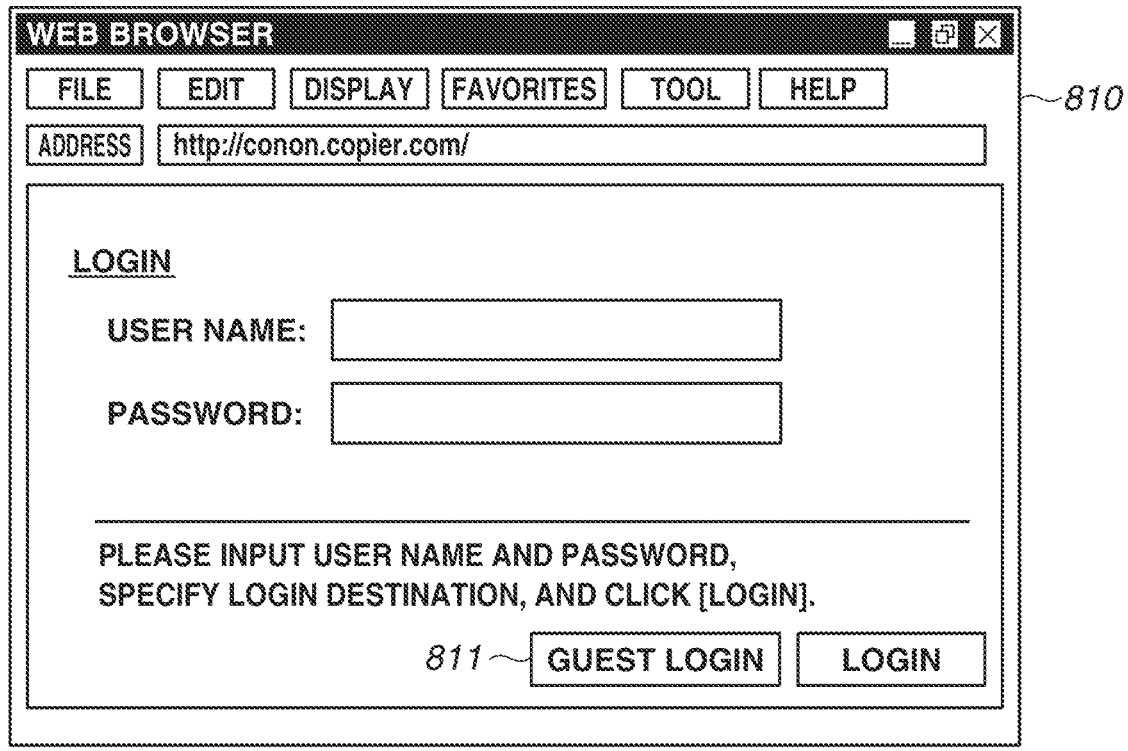

FIGS. 8A and 8B illustrate examples of remote authentication screens. A remote authentication screen 800 in FIG. 8A is a screen for authenticating the user so that the user uses the functions of the image forming apparatus 101 through the web browser on the PC 102. A user name entry field 801 is a field to which the user of the image forming apparatus 101 inputs a user name. A password entry field 802 is a field to which the user of the image forming apparatus 101 inputs a password. A "login" button 803 is a button for authenticating the user. In a case where the user presses the "login" button 803, the user authentication processing unit 402 authenticates the user based on the values input to the user name entry field 801 and the password entry field 802.

A remote authentication screen (guest login) 810 in FIG. 8B is a screen for providing the function of authenticating the user so that the user uses the functions of the image forming apparatus 101. Only the differences from the remote authentication screen 800 are described below. A "guest login" button 811 is a button for authenticating the user as a guest user. In a case where the user presses the "guest login" button 811, the user authentication processing unit 402 permits the user to log in, without authenticating the user based on the user name and the password. The user having logged in by pressing the "guest login" button 811 is assigned the user name "guest" and the role "guest user", and an available function is restricted according to the authority in the role information table in table 2. Although the details are omitted in the present exemplary embodiment, a screen to be displayed may be switched between the remote authentication screen 800 and the remote authentication screen (guest login) 810 according to the setting of the user authentication processing unit 402.

FIG. 9A illustrates an example of a screen for selecting a function that is displayed by the local UI control unit 400. FIG. 9B illustrates an example of a screen for selecting a function that is displayed by the remote UI control unit 401. The screen for selecting a function that is illustrated in each of FIGS. 9A and 9B is a list of functions provided in the image forming apparatus 101. The user of the image forming apparatus 101 can use the functions provided in the image forming apparatus 101 by pressing buttons displayed on the screen.

The function selection screen 900 in FIG. 9A is a screen displayed on the operation unit 209 by the local UI control unit 400 immediately after the user logs in on the authentication screen 700 or the authentication screen (guest login) 710. A plurality of function selection buttons 901 is buttons for using the functions of the image forming apparatus 101. A "copy" button is a button for displaying a screen where the copy function is used. A "transmission" button is a button for displaying a screen where the function of transmitting a scanned document to the PC 102 is used. A "saving" button is a button for displaying a screen where the function of saving a scanned digitized document in the HDD 204 is used. In the present exemplary embodiment, a description of the screen displayed after each button is pressed is omitted.

In a case where a "document registration" button is pressed, the registration screen 1000 or a registration screen 1010 is displayed. In a case where a "registration document saving/printing" button is pressed, the registration document saving/printing screen 1100 is displayed. In a case where a "document verification" button is pressed, the document verification screen 1200 is displayed. A "logout" button 902 is a button displayed during a login and for executing a logout process. In a case where the "logout" button 902 is pressed, the logout process is executed. Then, the authentication screen 700 or the authentication screen (guest login) 710 is displayed.

A function selection screen 910 in FIG. 9B is an example of a screen displayed in the web browser on the PC 102 by the remote UI control unit 401 immediately after the user logs in on the remote authentication screen 800 or the remote authentication screen (guest login) 810. Function selection buttons 911 are buttons for using respective functions. Similarly to the function selection screen 900, a description of a screen displayed after a "saving" button is pressed is omitted. In a case where a "document registration" button is pressed, the registration screen 1020 or a registration screen 1030 is displayed. Ina case where a "registration document saving/printing" button is pressed, the registration document saving/printing screen 1110 is displayed. In a case where a "document verification" button is pressed, the document verification screen 1210 is displayed.

FIGS. 10A, 10B, 10C, and 10D illustrate examples of registration screens displayed by the application A 404 and the application B 405. In the present exemplary embodiment, the application A 404 displays the screens on the operation unit 209 via the local UI control unit 400 and in the web browser on the PC 102 via the remote UI control unit 401, and the application B 405 displays the screens only in the web browser on the PC 102. Alternatively, the application B 405 may also display the screens both on the operation unit 209 and in the web browser on the PC 102.

The registration screen 1000 in FIG. 10A is a screen for providing the function of registering information on a document in the blockchain apparatus 111 and also registering the document in the document management apparatus 103. A document selection setting 1001 is a setting for selecting a document as a registration target from a scanned paper document or a document saved in the image forming apparatus 101 and allows selection of either one of "scan" and "saved document". Scan settings 1002 are various settings for scanning.

A "blockchain" button 1003 is a button for selecting whether to register information on a document in the blockchain apparatus 111. In a case where the "blockchain" button 1003 is selected, information on a document is registered in the blockchain apparatus 111. In a case where the "blockchain" button 1003 is not selected, the information on the document is not registered in the blockchain apparatus 111. In response to a "register" button 1004 being pressed in a case where "scan" is selected in the document selection setting 1001, a document is scanned, to generate a digitized document. In response to the "register" button 1004 being pressed in a case where "saved document" is selected, a list of saved documents is displayed, and a document selected from the list by the user is acquired. Then, in a case where the "blockchain" button 1003 is selected, the digitized document is registered in the document management apparatus 103, and information on the digitized document is registered in the blockchain apparatus 111. In a case where the "blockchain" button 1003 is not selected, the digitized document is registered in the document management apparatus 103, and the information on the digitized document is not registered in the blockchain apparatus 111. A save location setting 1005 is a setting for specifying which path on the document management apparatus 103 a document is to be saved in.

Figure 10B:
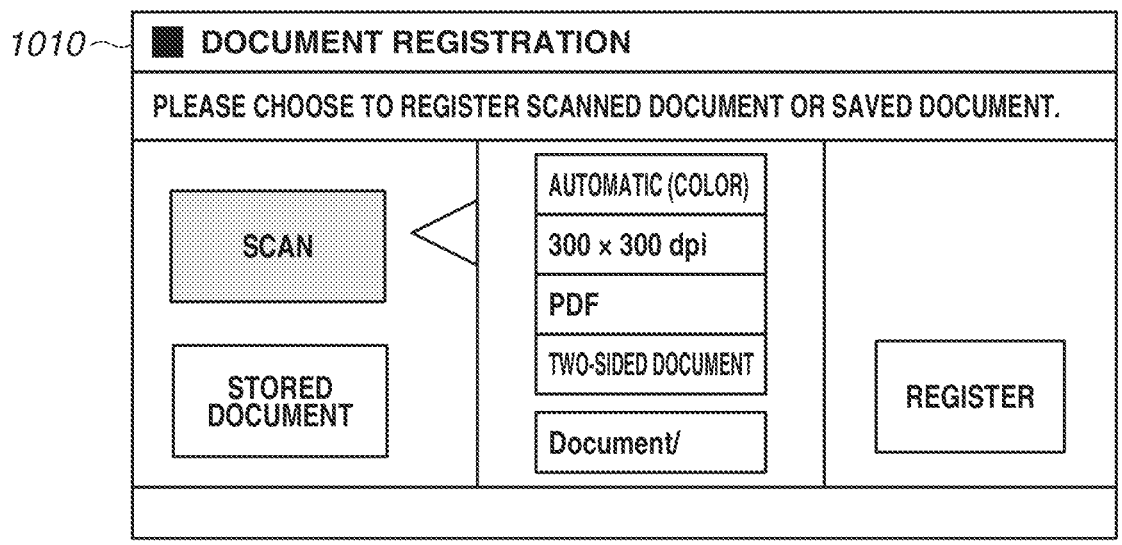

The registration screen 1010 in FIG. 10B is a screen for providing the function of registering a document in the document management apparatus 103, and is also a screen displayed to the user having logged in as a guest. In the present exemplary embodiment, since a guest user does not have authority to register document information in the blockchain apparatus 111, the registration screen 1010 is different from the registration screen 1000 in that the "blockchain" button 1003 is not displayed on the registration screen 1010.

Figure 10D:
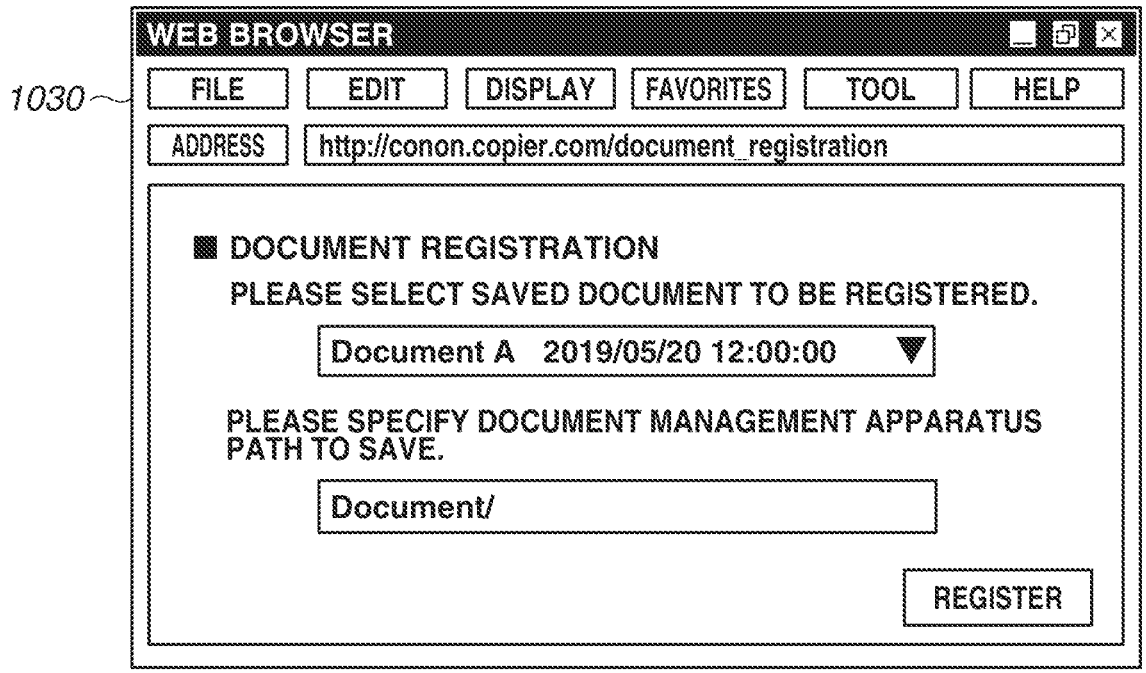

The registration screen 1020 in FIG. 10C is a screen for providing the function of registering information on a document in the blockchain apparatus 111 and also registering the document in the document management apparatus 103, and is an example of a screen displayed in the web browser on the PC 102. The registration screen 1030 in FIG. 10D is a screen for providing the function of registering a document in the document management apparatus 103, and is also a screen displayed in the web browser on the PC 102 to the user having logged in as a guest.

FIGS. 11A and 11B illustrate examples of screens for saving or printing a registered document that are displayed by the application A 404. The registration document saving/printing screen 1100 in FIG. 11A is a screen for providing the function of saving or printing a document managed by the document management apparatus 103. A document selection list 1101 is a list for selecting a document to be saved or printed. The application A 404 displays documents managed by the document management apparatus 103 in the document selection list 1101.

A "print (simplified)" button 1102 is a button for executing simplified printing of a document selected from the document selection list 1101. The simplified printing is performed to print a print product without verifying a document managed by the document management apparatus 103, using the blockchain service, and is the same as general printing.

A "print (distribution)" button 1104 is a button for creating a print product to enable the verification of a document selected from the document selection list 1101. The print product to enable the verification is created by embedding, in the print product, information that enables the verification of the document when the print product is printed. Further, using the blockchain apparatus 111 and the document management apparatus 103, the information embedded in the print product is used to enable verification that the print product is a proper print product. The details of this method will be described below. A "save" button 1103 is a button for saving a document selected from the document selection list 1101 in the HDD 204 of the image forming apparatus 101.

The registration document saving/printing screen 1110 in FIG. 11B is a screen for providing the function of saving or printing a document managed by the blockchain apparatus 111 and the document management apparatus 103, and is an example of a screen displayed in the web browser on the PC 102.

FIGS. 12A and 12B illustrate examples of screens for verifying a document that are displayed by the application A 404. The document verification screen 1200 in FIG. 12A is a screen for providing the function of, using the blockchain apparatus 111, verifying that a scanned document or a document saved in the image forming apparatus 101 is a formal document. A document selection setting 1201 is a setting for selecting a document as a verification target from a scanned paper document or a document saved in the image forming apparatus 101. A document selection list 1202 is a list for selecting a document as a verification target and is a list of documents saved in the HDD 204.

In response to a "verify" button 1203 being pressed in a case where "scan" is selected in the document selection setting 1201, a document is scanned, and then, the document is verified using the blockchain apparatus 111. In response to the "verify" button 1203 being pressed in a case where "saved document" is selected in the document selection setting 1201, a document selected from the document selection list 1202 is verified.

The document verification screen 1210 in FIG. 12B is a screen for providing the function of, using the blockchain apparatus 111, verifying that a document saved in the HDD 204 is a formal document, and is an example of a screen displayed in the web browser on the PC 102.

FIG. 13 is a flowchart of a process in which the image forming apparatus 101 registers information on a document in the blockchain apparatus 111. In the present exemplary embodiment, a description is given of a case where the user uses the image forming apparatus 101 via the control unit 200. Alternatively, the user may use the image forming apparatus 101 via the web browser on the PC 102. This flowchart is started by pressing the "login" button 703 on the authentication screen 700 and first executed as the processing of the user authentication processing unit 402 by the CPU 201.

At the start of this flowchart, the authentication screen 700 sends a user name and a password input by the user of the image forming apparatus 101 to the user authentication processing unit 402. In step S1301, the user authentication processing unit 402 receives the user name and the password as a login request. In step S1302, the user authentication processing unit 402 checks whether the received user name and password match a user name and a password in the user information table in table 1. In a case where the received user name and password match a user name and a password in the user information table in table 1, the user authentication processing unit 402 determines that the authentication of the user is successful (YES in step S1302), and the processing proceeds to step S1303. In a case where the received user name and password do not match a user name and a password in the user information table in table 1, the user authentication processing unit 402 determines that the authentication of the user is failed (NO in step S1302), and the processing proceeds to step S1314.

In step S1303, as a login process, the user authentication processing unit 402 holds the user name received in step S1301 as the currently logged-in user in the RAM 203 and hands over the processing to the local UI control unit 400. The local UI control unit 400 having taken over the processing displays the function selection screen 900 on the operation unit 209.

In this flowchart, then, the user presses the "document registration" button among the function selection buttons 901 on the function selection screen 900, and the following processing is executed as the processing of the application A 404 by the CPU 201. Based on the role of the currently logged-in user, the application A 404 having taken over the processing displays a screen on which function restriction is reflected. Specifically, in a case where the user name of the logged-in user is "guest", "guest user", which is the corresponding role, is prohibited from performing BC registration, and therefore, the application A 404 displays the registration screen 1010 where the function of registering a document in the blockchain apparatus 111 is restricted, on the operation unit 209. In a case where the user name of the logged-in user is other than "guest", the user is permitted to perform BC registration, and therefore, the application A 404 displays the registration screen 1000 on the operation unit 209.

In step S1314, the application A 404 displays that the authentication of the user is failed or that the user does not have authority to use the blockchain apparatus 111, on the operation unit 209 via the operation unit I/F 205 as an error process. Then, the processing ends. In step S1304, the application A 404 waits until the "register" button 1004 is pressed on the registration screen 1000. In a case where the "register" button 1004 is pressed (YES in step S1304), the processing proceeds to step S1305. In step S1305, in a case where "scan" is selected on the registration screen 1000 (YES in step S1305), the processing proceeds to step S1306. In a case where "saved document" is selected (NO in step S1305), the processing proceeds to step S1308.

In step S1306, the application A 404 executes a scanning process on a paper document using the scanner 211. In step S1307, based on data scanned in step S1306, the application A 404 generates a digitized document according to the scan settings 1002 and temporarily saves the digitized document in the HDD 204. This temporary data will be deleted when this flowchart ends.

In step S1308, in a case where the user name of the logged-in user is other than "guest" and the "blockchain" button 1003 is selected on the registration screen 1000 (YES in step S1308), the processing proceeds to step S1309. In a case where the user name of the logged-in user is "guest", or in a case where the user name of the logged-in user is other than "guest" and the "blockchain" button 1003 has not been selected on the registration screen 1000 (NO in step S1308), the processing proceeds to step S1315.

In step S1309, the application A 404 checks whether the user of the image forming apparatus 101 has authority to use the blockchain apparatus 111. In a case where the user has the authority (YES in step S1309), the processing proceeds to step S1310. In a case where the user does not have the authority (NO in step S1309), the processing proceeds to step S1314. As a method for allowing only a legitimate user of the image forming apparatus 101 to use the blockchain apparatus 111, determining that the user has the authority can be performed in a case where the role of the user name held in step S1303 is not "guest user". Alternatively, a role dedicated to a blockchain may be created, and the authority to use the blockchain apparatus 111 may be determined based on the role.

In step S1310, the application A 404 calculates the hash value of the digitized document generated in step S1307. In step S1311, the application A 404 requests the document management apparatus 103 to register the digitized document generated in step S1307. As a result, the application A 404 acquires an identification (ID) indicating the registered digitized document, and date and time information indicating the date and time when the registration is completed.

Up to step S1311, the application A 404 performs the processing. In step S1312, the blockchain application 406 executes the processing. In step S1312, the blockchain application 406 registers the digitized document in the blockchain apparatus 111. The registration process for registering the digitized document in the blockchain apparatus 111 will be described below with reference to FIG. 17. A description is given of values specified in the transaction 601 for registering the digitized document, and credential information.

As the document hash value 602, the hash value calculated in step S1310 is specified. As the document identification information 603, the ID indicating the digitized document that is received in step S1311 is specified. As the registration device identification information 604, the hash value of the credential information C 407 on the image forming apparatus 101 having performed printing is specified. As the document registration date and time 605, the date and time information received in step S1311 and indicating the date and time when the registration is completed is specified. As the document registerer 606, the hash value of the user name of the user logged into the image forming apparatus 101 on which the registration operation is performed is specified. Since an original document does not exist in this processing procedure, no value is specified as the original document hash value 607.

In addition to the values specified in the transaction 601, the application A 404 also sends the credential information A 408 to the blockchain application 406. The credential information A 408 is used by the blockchain application 406 to verify that a series of processes for the registration is performed by a legitimate application.

In step S1313, the application A 404 acquires the result of the registration process for registering the digitized document in the blockchain apparatus 111 from the blockchain application 406. In step S1315, the application A 404 executes a process similar to that of step S1311, and the processing proceeds to step S1316. In step S1316, the application A 404 displays the registration result acquired by the application A 404 in step S1313 on the operation unit 209 via the operation unit I/F 205. Specifically, the application A 404 displays information (not illustrated), such as the success or failure of the registration of the digitized document in the document management apparatus 103, or the success or failure of the registration of the digitized document in the blockchain apparatus 111, on the screen. Then, the processing ends.

Figure 14:
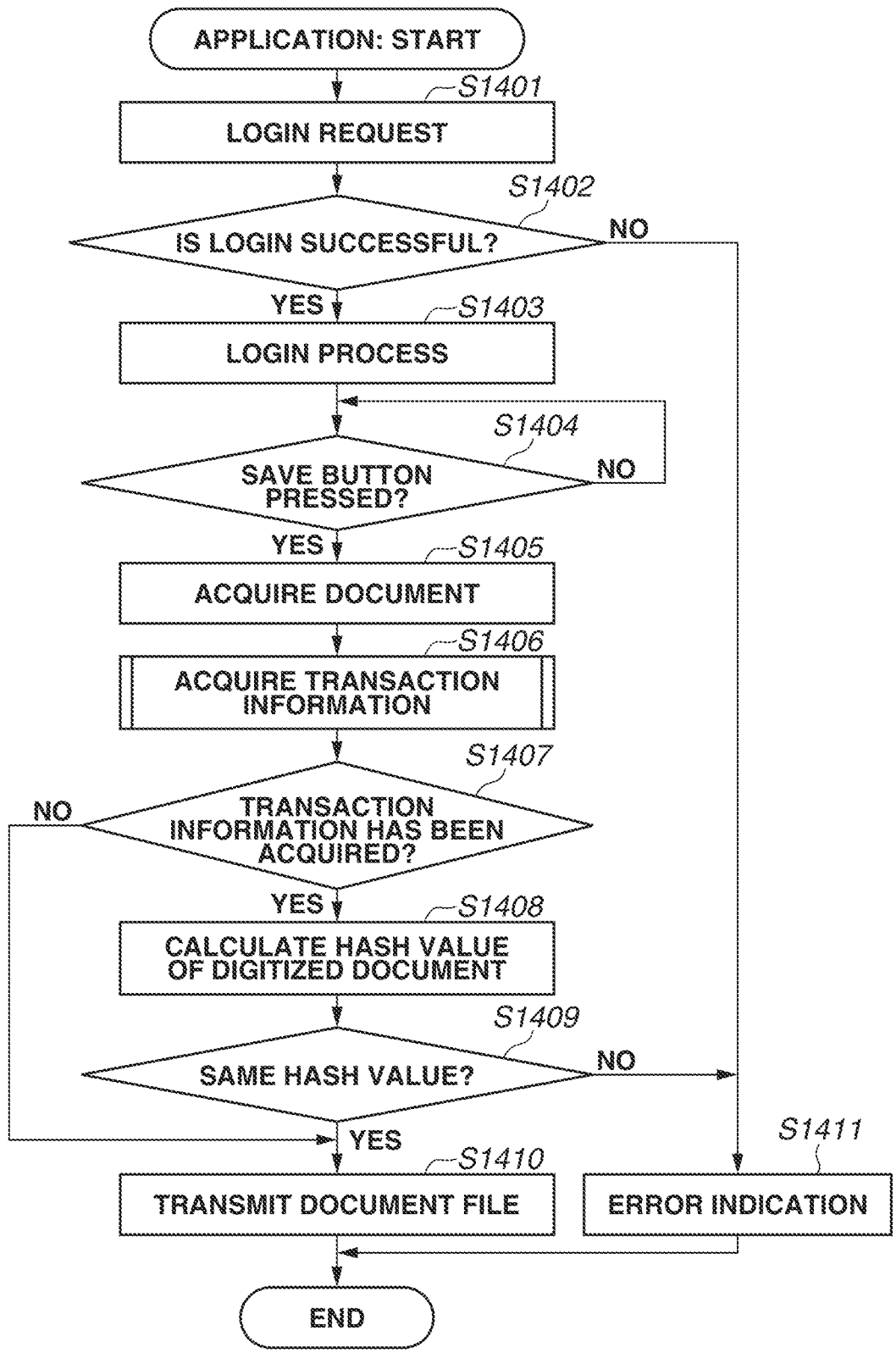
FIG. 14 is a flowchart illustrating a process of acquiring a digitized document from the document management apparatus and saving the digitized document.

FIG. 14 is a flowchart of the process of saving a digitized document saved in the document management apparatus 103 in the image forming apparatus 101. In the present exemplary embodiment, a description is given of a case where the user uses the image forming apparatus 101 via the control unit 200. Alternatively, the user may use the image forming apparatus 101 via the web browser on the PC 102. This flowchart is started by pressing the "login" button 703 on the authentication screen 700 and first executed as the processing of the user authentication processing unit 402 by the CPU 201.

At the start of this flowchart, the authentication screen 700 sends a user name and a password input by the user of the image forming apparatus 101 to the user authentication processing unit 402. In step S1401, the user authentication processing unit 402 receives the user name and the password as a login request. In step S1402, the user authentication processing unit 402 checks whether the received user name and password match a user name and a password in the user information table in table 1. In a case where the received user name and password match a user name and a password in the user information table in table 1, the user authentication processing unit 402 determines that the authentication of the user is successful (YES in step S1402), and the processing proceeds to step S1403. In a case where the received user name and password do not match a user name and a password in the user information table in table 1, the user authentication processing unit 402 determines that the authentication of the user is failed (NO in step S1402), and the processing proceeds to step S1411.

In step S1403, the user authentication processing unit 402 holds the user name received in step S1401 as the currently logged-in user in the RAM 203 and hands over the processing to the local UI control unit 400. The local UI control unit 400 having taken over the processing displays the function selection screen 900 on the operation unit 209. In this flowchart, then, the user presses the "registration document saving/printing" button among the function selection buttons 901 on the function selection screen 900, and the following processing is executed as the processing of the application A 404 by the CPU 201. The application A 404 having taken over the processing displays the registration document saving/printing screen 1100 on the operation unit 209.

In step S1404, the application A 404 displays the registration document saving/printing screen 1100 illustrated in FIG. 11A on the operation unit 209 via the operation unit I/F 205 and waits until the "save" button 1103 is pressed. In a case where the "save" button 1103 is pressed (YES in step S1404), the processing proceeds to step S1405. In step S1405, the application A 404 acquires a digitized document selected from the document selection list 1101 on the registration document saving/printing screen 1100 from the image forming apparatus 101. The application A 404 temporarily saves document information on the acquired digitized document in the RAM 203 and saves a document file of the acquired digitized document in the HDD 204. Up to step S1405, the application A 404 performs the processing. In step S1406, the blockchain application 406 executes the processing.

In step S1406, the blockchain application 406 acquires the transaction 601 having the ID of the document information saved in the RAM 203 in the document identification information 603. This acquisition process will be described below with reference to FIG. 17. In this operation, the application A 404 sends the credential information A 408 to the blockchain application 406. The credential information A 408 is used by the blockchain application 406 to verify that a series of processes for the acquisition of the digitized document is performed by a legitimate application.

In step S1407, the application A 404 determines whether the corresponding transaction information has been acquired in step S1406. In a case where the transaction information has not been acquired, i.e., does not exist (NO in step S1407), the transaction information is information that is not managed by the blockchain apparatus 111, and thus the processing proceeds to step S1410. In a case where the transaction information exists (YES in step S1407), the processing proceeds to step S1408.

In step S1408, the application A 404 calculates a hash value from the document data saved in the HDD 204. In step S1409, the application A 404 determines whether the calculated hash value is the same value as the document hash value 602 in the transaction information acquired in step S1406. In a case where the calculated hash value is not the same value (NO in step S1409), the document file saved in the document management apparatus 103 is improper data, and thus the processing proceeds to an error indication in step S1411. In a case where the calculated hash value is the same value (YES in step S1409), the processing proceeds to step S1410.

In step S1410, the application A 404 moves the document data temporarily saved in the HDD 204 in step S1405 to a legitimate save location in the HDD 204. While, in the present exemplary embodiment, the document data is saved in the HDD 204 of the image forming apparatus 101, the path to the save location is specified on the registration document saving/printing screen 1100 and the document data is saved at the specified location. In step S1411, the application A 404 gives an error indication for a case where the user cannot be permitted to acquire the digitized document in the processing procedure. Specifically, the application A 404 displays an error dialog (not illustrated) on the screen. In this operation, the application A 404 deletes the document file temporarily saved in the HDD 204.

Figure 15:
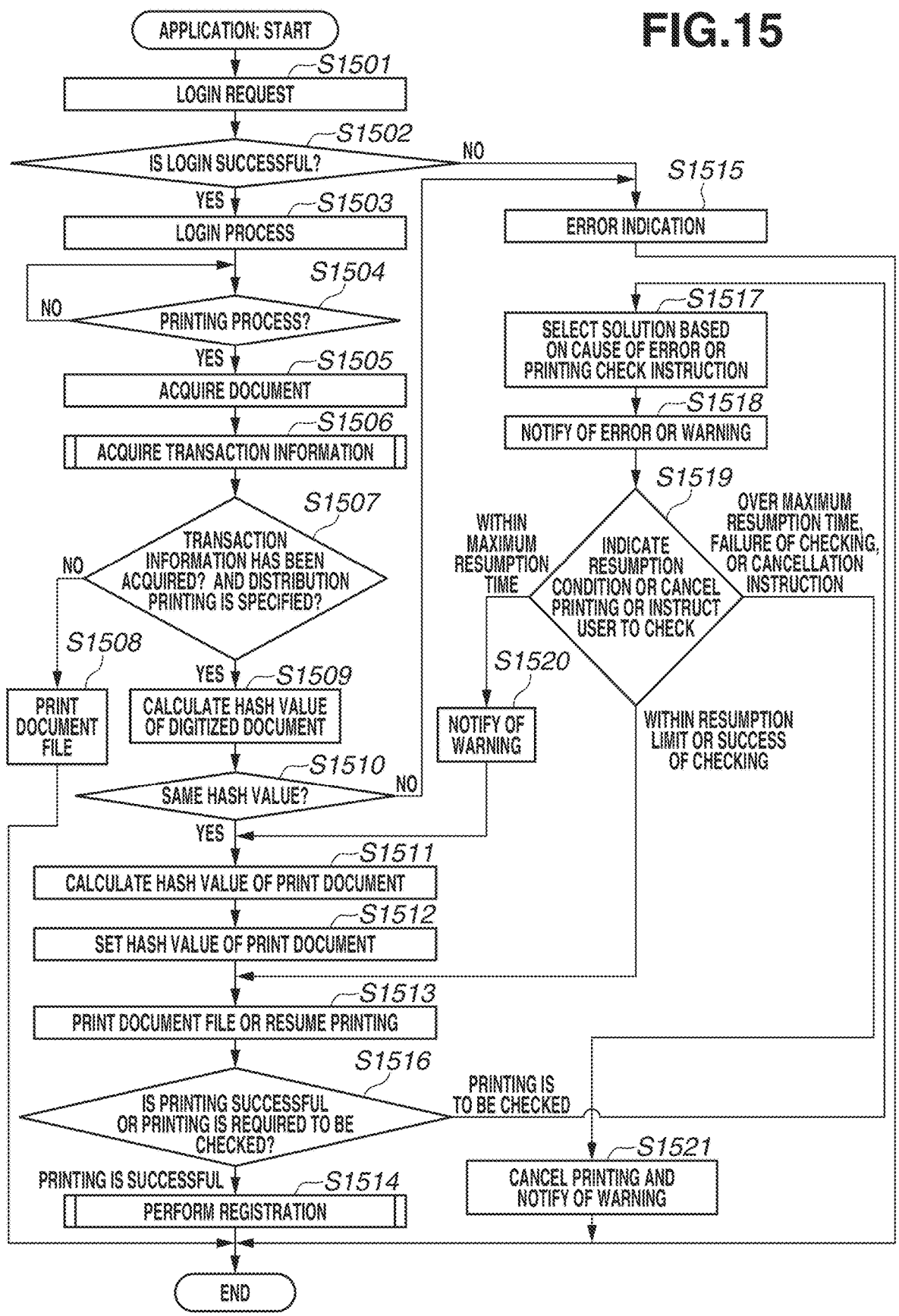
FIG. 15 is a flowchart illustrating a process in which the image forming apparatus prints a digitized document.

FIG. 15 is a flowchart of a printing process in which the image forming apparatus 101 prints a digitized document saved in the document management apparatus 103. In the present exemplary embodiment, a description is give of a case where the user uses the image forming apparatus 101 via the control unit 200. Alternatively, the user may use the image forming apparatus 101 via the web browser on the PC 102. This flowchart is started by pressing the "login" button 703 on the authentication screen 700 and first executed as the processing of the user authentication processing unit 402 by the CPU 201.

At the start of this flowchart, the authentication screen 700 sends a user name and a password input by the user of the image forming apparatus 101 to the user authentication processing unit 402. In step S1501, the user authentication processing unit 402 receives the user name and the password as a login request. In step S1502, the user authentication processing unit 402 checks whether the received user name and password match a user name and a password in the user information table in table 1. In a case where the received user name and password match a user name and a password in the user information table in table 1, the user authentication processing unit 402 determines that the authentication of the user is successful (YES in step S1502), and the processing proceeds to step S1503. In a case where the received user name and password do not match a user name and a password in the user information table in table 1, the user authentication processing unit 402 determines that the authentication of the user is failed (NO in step S1502), and the processing proceeds to step S1515.

In step S1503, the user authentication processing unit 402 holds the user name received in step S1501 as the currently logged-in user in the RAM 203 and hands over the processing to the local UI control unit 400. The local UI control unit 400 having taken over the processing displays the function selection screen 900 on the operation unit 209. In this flowchart, then, the user presses the "registration document saving/printing" button among the function selection buttons 901 on the function selection screen 900, and the following processing is executed as the processing of the application A 404 by the CPU 201. The application A 404 having taken over the processing displays the registration document saving/printing screen 1100 on the operation unit 209.

In step S1504, the application A 404 displays the registration document saving/printing screen 1100 illustrated in FIG. 11A on the operation unit 209 via the operation unit I/F 205 and waits until the "print (simplified)" button 1102 or the "print (distribution)" button 1104 is pressed. In a case where the "print (simplified)" button 1102 or the "print (distribution)" button 1104 is pressed (YES in step S1504), the processing proceeds to step S1505.

In step S1505, the application A 404 acquires from the image forming apparatus 101 a digitized document selected from the document selection list 1101 on the registration document saving/printing screen 1100. The application A 404 temporarily saves document information on the acquired digitized document in the RAM 203 and saves a document file of the acquired digitized document in the HDD 204. Up to step S1505, the application A 404 performs the processing. In step S1506, the blockchain application 406 executes the processing.

In step S1506, the blockchain application 406 acquires the transaction 601 having the ID of the document information saved in the RAM 203 in the document identification information 603. This acquisition process will be described below with reference to FIG. 17. In this operation, the application A 404 sends the credential information A 408 to the blockchain application 406. The credential information A 408 is used by the blockchain application 406 to verify that a series of processes for the acquisition of the digitized document is performed by a legitimate application.

In step S1507, the application A 404 determines whether the corresponding transaction information has been acquired in step S1506 and whether distribution printing is specified in step S1505. In a case where the transaction information has not been acquired, i.e., does not exist, or not distribution printing but simplified printing is specified (NO in step S1507), the digitized document is a document that is not managed by the blockchain apparatus 111, or simplified printing for which verification is not performed on the digitized document is specified, and thus the processing proceeds to step S1508. In a case where the transaction information exists, and distribution printing for which verification is performed on the digitized document is specified (YES in step S1507), the processing proceeds to step S1509. In step S1508, the application A 404 causes the printer 210 to perform a printing process for printing the document data saved in the HDD 204, via the printer I/F 206 of the image forming apparatus 101.

In step S1509, the application A 404 calculates a hash value from the document data saved in the HDD 204. In step S1510, the application A 404 determines whether the calculated hash value is the same value as the document hash value 602 in the transaction information acquired in step S1507. In a case where the calculated hash value is not the same value (NO in step S1510), the document file saved in the document management apparatus 103 is improper data, and thus the processing proceeds to an error indication in step S1515. In a case where the calculated hash value is the same value (YES in step S1510), the processing proceeds to step S1511.

In step S1511, the application A 404 calculates a hash value to be set for a print document. Specifically, the hash value is calculated using the document hash value 602 in the transaction information acquired in step S1507, the credential information C 407 on the image forming apparatus 101 that performs the processing, and date and time information in the image forming apparatus 101 at the time of the process of this step.

In step S1512, the application A 404 sets the hash value indicating the print product that is calculated in step S1511 and the document hash value 602 in the transaction information indicating the original image in a file to be printed in step S1513. In this operation, the hash value and the document hash value 602 are set in a format that can be read in a case where printing and scanning is performed in the verification described below. Examples of the format include information that can be determined on a print product, such as a two-dimensional barcode, or may be embedded as invisible information in a print image.

In step S1513, the application A 404 causes the printer 210 to perform a printing process for printing the document file in which the hash value is set, via the printer I/F 206 of the image forming apparatus 101. In this operation, the document hash value 602 is recorded on the print product. In a case where a print sheet that is used in the printing has the function of storing digitized information, a method for recording the document hash value 602 using this function may be employed. Alternatively, a method for updating the hash value indicating the print product together with identification information obtained from the print sheet may be employed. Yet alternatively, a method for treating physical information obtained from the print sheet as identification information and updating the hash value indicating the print product together with the physical information may be employed.

In step S1516, the application A 404 determines whether the printing started in step S1513 is completed. In a case where the entire document file is printed without any problem, the processing proceeds to step S1514. However, in a case where the printing is suspended due to an error in the printer 210, such as a shortage of paper, a shortage of ink, or a paper jam, or by a user instruction, or in a case where the printing needs to be checked, the processing proceeds to step S1517.

In step S1517, based on the cause of the suspension of the printing or the content of the user instruction, the application A 404 selects a time limit within which a recovery should be made, and a recovery method. Table 4 is an information table for performing the process of step S1517. In table 4, "ID" is the identification number of the cause of the suspension of printing or the content of a user instruction. "Error/check name" is the name of the cause or the content. Each cause or content has "warning content", and the user is notified of "warning content" on the screen of a device or by electronic mail. The method for notifying an external apparatus of "warning content" is not limited to the form of electronic mail, and may be any method so long as the external apparatus can be notified of a message. "Warning is restarted, and then, the user is notified by electronic mail that the device is restarted (step S1518), and the printing is stopped and cancelled (steps S1518 and S1519). In this operation, information for a reprinting instruction is added to the electronic mail, and the user easily gives a reprinting instruction using the added information and the processing in FIG. 15 can be performed again.

The ID "8" corresponds to a case where the user issues an instruction to check a print product when a print instruction is issued. In a case where an error occurs during the printing, any of the IDs "1" to "7" is selected. Meanwhile, the ID "8" is selected for the case where the user is notified by electronic mail that the printing is completed (step S1518) in response to completion of the printing without any problem, and the processing branches according to the content of the check by the user (step S1519).

TABLE 4

Cause-of-Error/Printing Check Handling Information

| ID | Error/Check Name | Warning Content | Printing Check | Handling Method |
| --- | --- | --- | --- | --- |
| 1 | Print Setting Abnormality | "Setting Error Is Occurring . . ." | Not Necessary | Notify by Email and Cancel Printing |
| 2 | Sheet Shortage | "Sheets Run Out . . ." | Not Necessary | Notify by Email |
| 3 | Consumable Product Shortage | "XXX Runs Out . . ." | Not Necessary | Notify by Email |
| 4 | Sheet Jam | "Sheet Jam Is Occurring. Please Make Recovery." | Not Necessary | Notify by Email |
| 5 | Abnormal State | "Error (Error Code: YYY)." | Not Necessary | Notify by Email |
| 6 | Resumption After Power-Off | "Device Is Restarted. Please Perform Reprinting." | Not Necessary | Notify by Email and Cancel Printing |
| 7 | User Cancellation Operation | "Cancelled." | Not Necessary | Notify by Email and Cancel Printing |
| 8 | Check Print Product by User | "Please Check Print Product." | Necessary | Notify by Email When Printing Is Completed | content" describes only a main portion. In each warning content, a portion where XXX or YYY is described for simplicity and normally includes the name of a consumable product or an error code. While, in the case of a printing error, "not necessary" is set for "printing check", "necessary" is set for "printing check" in a case where the user issues an instruction to check a print product.

"Handling method" is a process to be performed in this operation. In step S1517, the application A 404 selects a corresponding printing error process from table 4. Although the details will be described below, in table 4, in the case of "print setting abnormality" corresponding to the ID "1", since printing processing cannot be started, the user is notified by electronic mail that printing processing cannot be started (step S1518), and the printing is stopped and cancelled (steps S1518 and S1519).

In the case of "sheet shortage" corresponding to the ID "2", printing work cannot be performed because sheets run out when printing is started or while printing is performed. In this case, the user is notified by electronic mail that sheets run out (step S1518), and then, the user replenishes sheets, or the handling differs depending on the time of this replenishment work (a process after the branch of step S1519).

In the case of the ID "6", i.e., in a case where a device is powered off and a printing process is suspended, the device In step S1518, the application A 404 performs the process of "handling method" in table 4 that is selected in step S1517, to notify the user of the cause of the suspension of the printing, the recovery method, and the time limit. This notification is issued by displaying these pieces of information as an error message on the registration document saving/printing screen 1100 in FIG. 11A or transmitting these pieces of information to the user by electronic mail. Then, this distribution printing processing changes depending on the results of determining whether the recovery is performed by the work of the user, or the check of the user (step S1519).

In step S1519, according to whether the recovery is performed within the time limit by the work of the user, or the content of the user instruction, the application A 404 performs a determination for determining a subsequent process. Table 5 is table information describing information such as conditions for performing the determination. In table 5, "ID" is the same as "ID" in table 4. The same identification number corresponds to the same cause of the suspension of printing or the same content of a user instruction. "Resumption limit" is related to the time from when a printing error occurs to when the error is resolved by handling the cause of the error and the printing is resumed. In a case where printing is resumed within the time of "resumption limit", a process described in "handling within resumption limit" in table 5 is performed.

In a case where the time taken to resume printing is over the time of "resumption limit" but within "maximum resumption time" in table 5, the process of "handling within maximum resumption time" in table 5 is performed. In the cases of the IDs "2", "3", "4", and "5", in a case where printing becomes able to be resumed by replenishing sheets or a consumable product or removing a sheet jam within the time of "resumption limit" in table 5, the processing proceeds to step S1513, and the printing is continued (in this case, printed print products do not include an unnecessary print product).

In a case where the time taken to resume printing is over the time of "resumption limit" but within "maximum resumption time" in table 5, the processing proceeds to step S1511 via step S1520, the hash value of the print document is calculated again, and the printing is performed again. Even in a case where the time taken to resume printing is over "maximum resumption time" in table 5, but in a case where the printing does not become able to be resumed by replenishing paper or a consumable product or removing a sheet jam, the process of "handling over maximum resumption time" in table 5 is performed, and the printing is cancelled (step S1521). In the cases of the IDs "1", "6", "7", and "8", time for resumption is not limited, and therefore, no information is provided in table 5.

Table 6 is table information describing information on handling after printing. In table 6, "process after printing/checking ends" describes the content of a process when printing is completed, or when checking is successful in a case where a printing checking instruction is issued. In a case where printing is resumed or printing is cancelled, and in a case where a previous print product is left, the previous print product is treated as an unnecessary print product.

The ID "1" corresponds to a case where printing cannot be started according to the content of an error. In other cases, the state of an unnecessary print product differs depending on how far printing is performed when an error or a cancellation operation occurs. Thus, the state is checked, and then whether an unnecessary print product has been produced is determined. This information is described in "unnecessary print product" in table 6. Then, "user warning" describes a warning content to be presented to the user by screen display and/or email notification when an unnecessary print product is produced.

In step S1519, according to these pieces of information in tables 5 and 6, the application A 404 performs a determination for determining a subsequent process. According to the result of this determination, in a case where the printing is resumed within the time of "resumption limit" in response to a printing error, or in a case where checking is successful in response to a printing checking instruction, the processing proceeds to step S1513. In a case where the printing is resumed within "maximum resumption time", the processing proceeds to step S1511 via step S1520. In step S1511, the application A 404 calculates the hash value of the print document again, but the document continues to be printed. In a case where the time taken to resume the printing is over "maximum resumption time", or in a case where checking is failed in response to a printing checking instruction, or in a case where a printing cancellation instruction is issued by the user, the processing proceeds to step S1521.

In step S1520, in a case where an unnecessary print product has been produced based on table 6, the application A 404 presents a warning content to the user by screen display and/or email notification. Then, the processing proceeds to step S1511. In step S1521, the application A 404 performs the process of cancelling the printing. Specifically, the application A 404 cancels the printing and presents a warning content to the user by screen display or email notification based on table 6. Then, the processing ends.

In this manner, at the occurrence of a printing error, in a case where the printing is resumed within the time of "resumption limit", the printing is resumed similarly to normal printing, and an unnecessary print product is not produced. However, if not, the hash value of a print document is recreated, and the printing is continued, or the printing is cancelled, and the user issues an instruction to perform reprinting to cause the printing to be performed all over again so that the hash value of a new print document is created, and the new print document is printed.

Although an unnecessary print product is produced in the operation, the transaction 601 is not registered with the hash value of the print document of this unnecessary print product in the BC service in step S1514 (the hash value of the print document is not used). Thus, when verification is performed on the unnecessary print product, a hash value corresponding to the hash value of the print product is not found, and the verification is failed. Consequently, a print document of a product printed by the time of the resumption of the printing is not regarded as a proper distribution product. This leads to preventing the improper distribution or the abuse of the print product. Alternatively, a method for registering the hash value of the print document of the unnecessary print product as a failed print product in the BC is also possible. The most important thing in the present invention is that an original hash value that is to be registered in a case where printing is successful is prevented from being registered as a normal hash value in the BC service.

TABLE 5

Information on Subsequent Handling

| ID | Resumption Limit | Handling Within Resumption Limit | Maximum Resumption Time | Handling Within Maximum Resumption Time | Handling Over Maximum Resumption Time |
|---|---|---|---|---|---|
| 1 | Absent | Absent | Absent | Absent | Absent |
| 2 | 10 Minutes | Continue Printing | 1 Hour | Recreate Hash of Print Document | Cancel Printing |
| 3 | 10 Minutes | Continue Printing | 1 Hour | Recreate Hash of Print Document | Cancel Printing |
| 4 | 10 Minutes | Continue | 1 Hour | Recreate Hash | Cancel |

TABLE 5-continued

Information on Subsequent Handling

| ID | Resumption Limit | Handling Within Resumption Limit | Maximum Resumption Time | Handling Within Maximum Resumption Time | Handling Over Maximum Resumption Time |
|---|---|---|---|---|---|
| 5 | 20 Minutes | Continue Printing | 1 Hour | of Print Document Recreate Hash of Print Document | Printing Cancel Printing |
| 6 | Absent | Absent | Absent | Absent | Absent |
| 7 | Absent | Absent | Absent | Absent | Absent |
| 8 | Absent | Absent | Absent | Absent | Absent |

TABLE 6

Information on Handling After Printing

| ID | Process After Printing/Checking Ends | Unnecessary Print Product | User Warning If Unnecessary Print Product Has Been Produced |
|---|---|---|---|
| 1 | When Printing Is Successful, Register Image ID | Absent | Absent |
| 2 | When Printing Is Successful, Register Image ID | (Checking State) | "Printed Document Has Become Invalid Print Product." |
| 3 | When Printing Is Successful, Register Image ID | (Checking State) | "Printed Document Has Become Invalid Print Product." |
| 4 | When Printing Is Successful, Register Image ID | Produced | "Printed Document Has Become Invalid Print Product." |
| 5 | When Printing Is Successful, Register Image ID | (Checking State) | "Printed Document Has Become Invalid Print Product." |
| 6 | When Printing Is Successful, Register Image ID | (Checking State) | "Printed Document Has Become Invalid Print Product." |
| 7 | Absent | (Checking State) | "Printed Document Has Become Invalid Print Product." |
| 8 | When Printing Is Successful, Register Image ID | Produced | Absent |

Up to the above steps, the application A 404 performs the processing. In step S1514, the blockchain application 406 executes the processing. In step S1514, the blockchain application 406 registers information on the printing process in the blockchain apparatus 111. This registration process will be described below with reference to FIG. 17. A description is given of values specified in the transaction 601 for registering the information.

As the document hash value 602, the hash value of the print document calculated in step S1511 is specified. As the document identification information 603, the ID received as an argument is specified to indicate the digitized document. As the registration device identification information 604, the hash value of the credential information C 407 on the image forming apparatus 101 having performed printing is specified. As the document registration date and time 605, the date and time information indicating the date and time when the hash value is searched for in step S1511 is specified. As the document registerer 606, the hash value of the user name of the user logged into the image forming apparatus 101 having performed the printing is specified. As the original document hash value 607, the document hash value 602 in the transaction information acquired in step S1506 and indicating the original image is specified.

In this operation, the application A 404 passes the credential information A 408 to the blockchain application 406. The credential information A 408 is used by the blockchain application 406 to verify that a series of processes regarding the acquisition of the digitized document is performed by a legitimate application. In step S1515, the application A 404 gives an error indication in a case where the user cannot be permitted to perform printing in the processing procedure. Specifically, the application A 404 displays an error dialog (not illustrated) on the screen.

Figure 16:
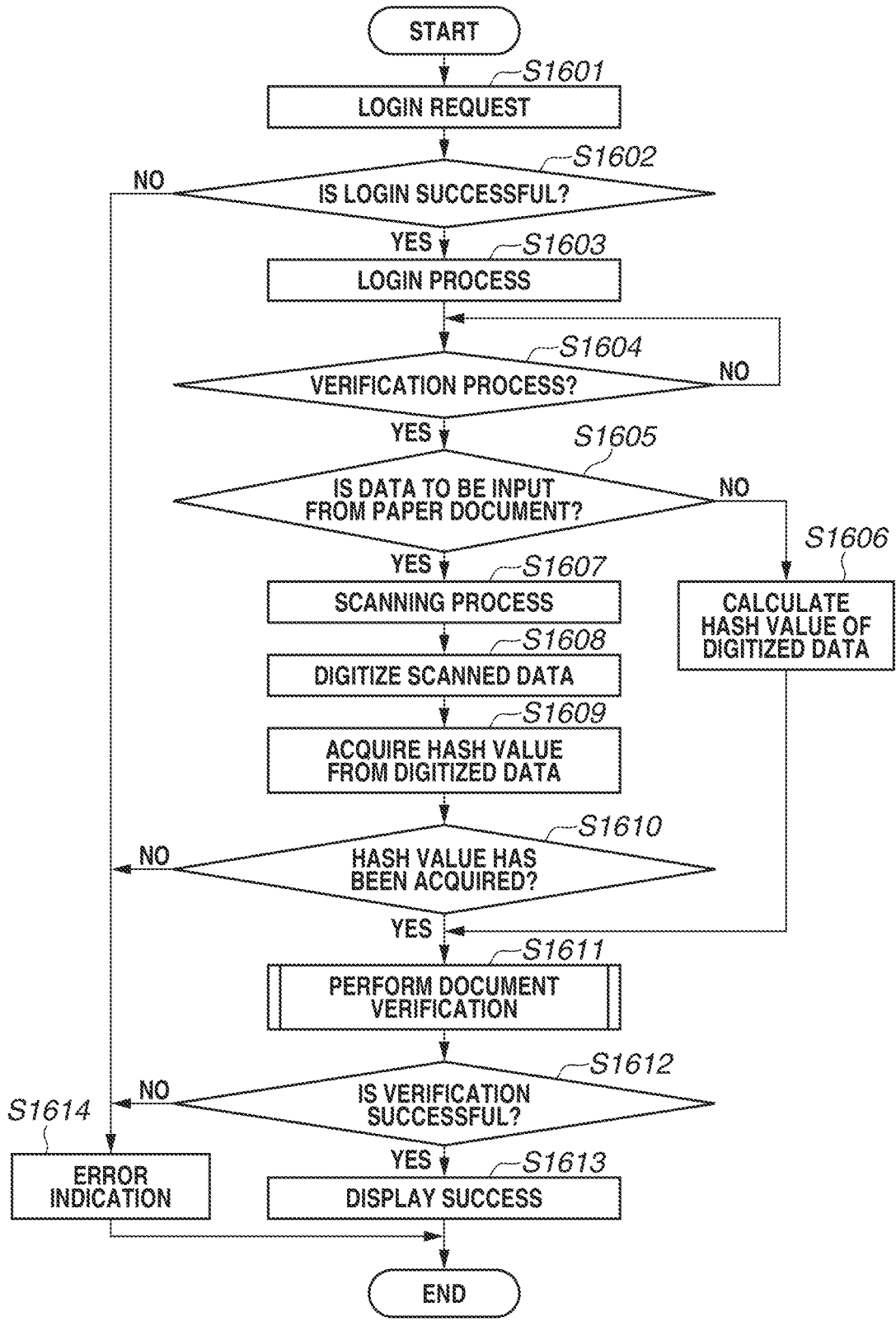
FIG. 16 is a flowchart illustrating a process of verifying a digitized document.

FIG. 16 is a flowchart of a verification process in which the image forming apparatus 101 verifies a document file specified by the user or a printed paper document. This flowchart is started by pressing the "login" button 703 or the "guest login" button 711 on the authentication screen 700 of the image forming apparatus 101 illustrated in FIGS. 7A and 7B and first executed as the processing of the user authentication processing unit 402 by the CPU 201. When this flowchart starts, the authentication screen 700 sends a user name and a password input by the user of the image forming apparatus 101 to the user authentication processing unit 402.

In step S1601, the user authentication processing unit 402 receives the user name and the password as a login request. In step S1602, the user authentication processing unit 402 checks whether the received user name and password match a user name and a password in the user information table in table 1. In a case where the received user name and password match a user name and a password in the user information table in table 1, the user authentication processing unit 402 determines that the authentication of the user is successful (YES in step S1602), and the processing proceeds to step S1603. In a case where the received user name and password do not match a user name and a password in the user information table in table 1, the user authentication processing unit 402 determines that the authentication of the user is failed (NO in step S1602), and the processing proceeds to step S1614.

In step S1603, as a login process, the user authentication processing unit 402 holds the user name received in step S1601 as the currently logged-in user in the RAM 203 and hands over the processing to the local UI control unit 400. The local UI control unit 400 having taken over the processing displays the function selection screen 900 on the operation unit 209. In this flowchart, then, the user presses the "document verification" button among the function selection buttons 901 on the function selection screen 900, and the following processing is executed as the processing of the application A 404 by the CPU 201. The application A 404 having taken over the processing displays the document verification screen 1200 on the operation unit 209.

In step S1604, the application A 404 displays the document verification screen 1200 illustrated in FIG. 12A on the operation unit 209 via the operation unit I/F 205 and waits until the "verify" button 1203 is pressed. In a case where the "verify" button 1203 is pressed (YES in step S1604), the processing proceeds to step S1605. In step S1605, based on the value of the document selection setting 1201 received when the processing is started, the application A 404 determines whether a target document is paper data. In a case where the target document is paper data (YES in step S1605), the processing proceeds to step S1607. In a case where the target document is digitized data (NO in step S1605), the processing proceeds to step S1606. In step S1606, the application A 404 identifies selected digitized data in the HDD 204 and calculates the hash value of the digitized data. This hash value indicates a document as a verification target and is used in a verification process in step S1611.

In step S1607, the application A 404 scans a paper document set in the image forming apparatus 101. In the scanning, the scanner 211 reads the paper document via the scanner I/F 207, to generate image data. In step S1608, the application A 404 digitizes the image data generated by the scanner 211 and temporarily saves the image data as digitized data in the HDD 204. This temporary data will be deleted when this flowchart ends.

In step S1609, the application A 404 acquires the hash value embedded in the digitized data saved in the HDD 204 in step S1608. In this acquisition, the application A 404 performs the process of acquiring the hash value according to the method for embedding the hash value in step S1512 in the printing flowchart described above with reference to FIG. 15. In step S1610, the application A 404 determines whether the hash value has been acquired from the digitized data. In a case where the hash value has been acquired (YES in step S1610), the processing proceeds to step S1611. In a case where the hash value has not been acquired (NO in step S1610), a verification process cannot be performed, and therefore the processing proceeds to step S1614.

Up to step S1610, the application A 404 performs the processing. In step S1611, the blockchain application 406 executes the processing. In step S1611, the blockchain application 406 performs a document verification process using transaction information recorded in the blockchain apparatus 111. This document verification process will be described below with reference to FIG. 17. In this process, the blockchain application 406 specifies document verification as a process type and passes the document hash value calculated in step S1606 or acquired in S1609 and the credential information A 408. In response to receiving the result of the requested process, in step S1612, the application A 404 determines the result of the verification.

In a case where the verification is successful (YES in step S1612), then in step S1613, the application A 404 displays a standard dialog (not illustrated) indicating a message that the verification is successful. In a case where the verification is failed (NO in step S1612), then in step S1614, the application A 404 displays a standard dialog (not illustrated) indicating a message that the verification is failed or that the verification is not possible. After each message is displayed, and in response to the user issuing an instruction to close the dialog, this flowchart ends.

Figure 17:
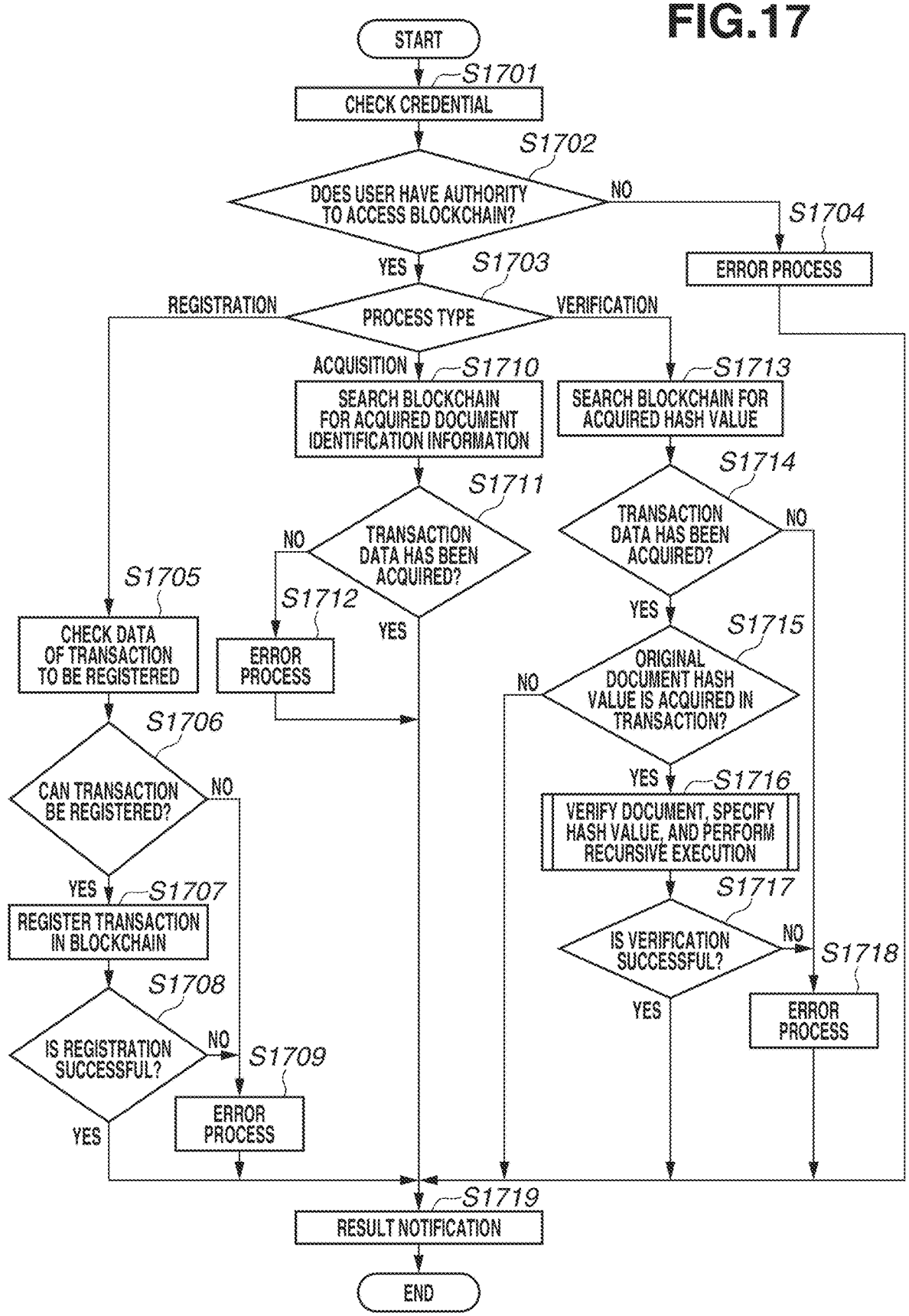
FIG. 17 is a flowchart illustrating a transaction process on the blockchain apparatus.

FIG. 17 is a flowchart in which the blockchain application 406 of the image forming apparatus 101 performs a transaction process on the blockchain apparatus 111. This flowchart is started and executed as the processing of the blockchain application 406 during the processing of the application A 404 in FIGS. 13 to 16.

At the start of this flowchart, the application A 404 passes the specifying of the process type in the blockchain apparatus 111 and information necessary for each process type to the blockchain application 406. The information necessary for each process type is the transaction 601 in a case where transaction registration is specified. The information is the document hash value 602 that needs to be verified in a case where document verification is specified. The information is the document identification information 603 in a case where transaction acquisition is specified.

In step S1701, the blockchain application 406 sends the credential information C 407 and the credential information A 408 to the blockchain apparatus 111 and checks that the credential information C 407 and the credential information A 408 are proper credential information. In this operation, the credential information C 407 acquired from the credential information management unit 410 at the start of the blockchain application 406 is used. The credential information A 408 acquired from the application A 404 is used.

In step S1702, the blockchain application 406 determines whether the credential information checked in step S1701 is proper credential information. The determination of whether the credential information is proper credential information is performed as follows. In a case where the credential information is a digital certificate, the blockchain application 406 verifies the certificate, and in a case where the verification is successful, the blockchain application 406 determines that the credential information is proper credential information. In a case where the credential information is a data value determined in advance, and in a case where the value matches a reference value, the blockchain application 406 determines that the credential information is proper credential information. In a case where the credential information is a proper credential (YES in step S1702), the user can access the blockchain apparatus 111, and therefore, the processing proceeds to step S1703. In a case where the credential information is not a proper credential (NO in step S1702), the processing proceeds to step S1704.

In step S1703, the blockchain application 406 determines the process type received by the blockchain application 406. In a case where the process type is transaction registration, the processing proceeds to step S1705. In a case where the process type is transaction acquisition, the processing proceeds to step S1710. In a case where the process type is document verification, the processing proceeds to step S1713. In step S1704, the blockchain application 406 generates error information indicating that authority to access the blockchain apparatus 111 is not satisfied in the processing procedure.

In step S1705, the blockchain application 406 checks whether the transaction information received at the start of the processing is complete transaction information. The checking is performed as follows. Regarding the document hash value 602, the blockchain application 406 searches the blockchain apparatus 111 for the document hash value 602, to determine that the document hash value 602 is not registered in the blockchain apparatus 111. Regarding the original document hash value 607, the blockchain application 406 searches the blockchain apparatus 111 for the original document hash value 607, to determine that the original document hash value 607 is registered in the blockchain apparatus 111. In a case where the information is incomplete, or a hash value is not in a proper state, the transaction information is improper information. In step S1706, the blockchain application 406 determines the result of this check. In a case where the transaction information is proper information (YES in step S1706), the processing proceeds to step S1707. In a case where the transaction information is improper information (NO in step S1706), the processing proceeds to an error process in step S1709.

In step S1707, the blockchain application 406 requests the blockchain apparatus 111 to register the checked transaction 601. In this step, the blockchain application 406 receives a success or a failure as the result of the registration process from the blockchain apparatus 111. In step S1708, the blockchain application 406 receives the result of the process from the blockchain apparatus 111. In a case where the result of the process is a failure (NO in step S1708), the processing proceeds to the error process in step S1709. In a case where the result of the process is a success (YES in step S1708), the processing proceeds to a result notification in step S1719. In step S1709, the blockchain application 406 generates error information indicating that the transaction registration cannot be performed in the processing procedure.

In step S1710, the blockchain application 406 searches the blockchain apparatus 111 for a transaction holding the document identification number received at the start of the processing. Then, the blockchain application 406 acquires the transaction. In step S1711, the blockchain application 406 determines the result of the search. In a case where the transaction data has not been acquired (NO in step S1711), a target document is not registered in the blockchain apparatus 111. Then, the processing proceeds to an error process in step S1712. In a case where the transaction data has been acquired (YES in step S1711), the processing proceeds to step S1719. In step S1712, the blockchain application 406 generates error information indicating that the transaction acquisition is failed in the processing procedure.

In step S1713, the blockchain application 406 searches the blockchain apparatus 111 for a transaction holding as the document hash value received at the start of the processing. Then, the blockchain application 406 acquires the transaction. In step S1714, the blockchain application 406 determines the result of the search. In a case where the transaction data has been acquired, the blockchain application 406 determines that the hash value is a proper hash value (YES in step S1714), and the processing proceeds to step S1715. In a case where the transaction data has not been acquired, the blockchain application 406 determines that the hash value is an improper hash value (NO in step S1714), and the processing proceeds to an error process in step S1718.

In step S1715, the blockchain application 406 determines whether the transaction acquired in step S1713 has the original document hash value. In a case where the transaction does not have the original document hash value (NO in step S1715), the hash value checked in step S1707 corresponds to a document at the beginning, and therefore the verification process ends. Thus, the processing proceeds to step S1719. In a case where the transaction has the original document hash value (YES in step S1715), it is necessary to check whether an original document corresponding to the original document hash value exists. Thus, the processing proceeds to step S1716.

In step S1716, the blockchain application 406 specifies document verification as the process type and also specifies the original document hash value as information necessary for the process. Then, the blockchain application 40G recursively executes the flowchart in FIG. 17. In step S1717, the blockchain application 406 determines the result of the execution. In a case where the verification including the original document is successful (YES in step S1717), the processing proceeds to step S1719. In a case where the verification is failed (NO in step S1717), the processing proceeds to the error process in step S1718.

In step S1718, the blockchain application 406 generates error information indicating that the document verification is failed in the processing procedure.

In step S1719, in the case of the transaction registration, the blockchain application 406 notifies the processing as the calling source of a registration completion status as information when the process of each process type is successful. In the case of the document verification, the blockchain application 406 notifies the processing as the calling source of a verification success status as the information. In the case of the transaction acquisition, the blockchain application 406 notifies the calling source of the acquired transaction information as the information. If the error process is performed, the blockchain application 406 notifies the calling source of the error information.

As described above, according to the present exemplary embodiment, in a case where a failed print product is produced due to an error in printing, control is performed not to register information on the failed print product as normal information. As a result, it is possible to prevent the abuse of the failed print product by ignoring the guarantee of the original, such as the distribution of the failed print product.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-014210, filed Jan. 30, 2020, which is hereby incorporated by reference herein in its entirety.

What is claimed is:

1. An image forming apparatus that cooperates with a management service and a blockchain service, the management service receiving a document via a network and storing the document, the blockchain service managing information on the document in block units, defining a relation between each of a plurality of blocks and blocks before and/or after the block, and managing the plurality of blocks using a plurality of nodes, the image forming apparatus including
a printer;
one or more memories storing instructions; and
one or more processors configured to, upon execution of the instructions, act as:
a printing unit configured to cause the printer to receive, from the management service, the document for which the information on the document has been registered in the blockchain service, and print the document; and
a registration unit configured to, upon completion of the printing of the document, register new information on the document into the blockchain service;
wherein the new information on the document is not registered into the blockchain service in a case where an error occurs during the printing of the document.

2. The image forming apparatus according to claim 1, further comprising
a scanner that scans a paper document; and
wherein the document stored in the management service is generated by the scanner scanning the paper document, and the information on the document is registered in the blockchain service when the document is stored in the management service.

3. The image forming apparatus according to claim 1, wherein a warning content according to a content of the error having occurred during the printing of the document is displayed on an operation unit of the image forming apparatus, and/or an external apparatus is notified of the warning content.

4. The image forming apparatus according to claim 1, wherein in a case where a content of the error that occurred during the printing of the document is a content of an error that requires cancellation of the printing, the printing is ended.

5. The image forming apparatus according to claim 1, wherein in a case where the error that occurred during the printing of the document is resolved within a first time, the printing is continued by resuming the printing of the document, and in a case where the printing is completed, the new information on the document is registered into the blockchain service.

6. The image forming apparatus according to claim 5, wherein in a case where the error that occurred during the printing of the document is resolved within a second time over the first time, the new information on the document is generated again, and the printing of the document is performed all over again, and in a case where the printing is completed, the new information on the document that is generated again is registered into the blockchain service.

7. The image forming apparatus according to claim 6, wherein in a case where the error that occurred during the printing of the document is not resolved within the second time, the new information on the document is not registered in-into the blockchain service, and the printing is ended.

8. The image forming apparatus according to claim 1, wherein the information on the document at least includes a hash value of the document.

9. The image forming apparatus according to claim 1, wherein, based on confirming that the information on the document stored in the management service has been registered in the blockchain service, the printing unit prints the document received from the management service.

10. A control method for controlling an image forming apparatus that cooperates with a management service and a blockchain service, the management service receiving a document via a network and storing the document, the blockchain service managing information on the document in block units, defining a relation between each of a plurality of blocks and blocks before and/or after the block, and managing the plurality of blocks using a plurality of nodes, the control method including:
receiving, from the management service, the document for which the information on the document has been registered in the blockchain service;
initiating printing of the document;
in a case where printing of the document is completed, upon completion of the printing of the document, registering new information on the document into the blockchain service; and
in a case where an error occurs during the printing of the document, not registering the new information on the document into the blockchain service.

11. The control method according to claim 10, wherein, based on confirming that the information on the document stored in the management service has been registered in the blockchain service, in the printing, the document received from the management service is printed.

12. A control method non-transitory computer-readable storage medium storing a program for an image forming apparatus that cooperates with a management service and a blockchain service, the management service receiving a document via a network and storing the document, and the blockchain service managing information on the document in block units, defining a relation between each of a plurality of blocks and blocks before and/or after the block, and managing the plurality of blocks using a plurality of nodes, the program including:
receiving, from the management service, the document for which the information on the document has been registered in the blockchain service;
initiating printing of the document;
in a case where printing of the document is completed, upon completion of the printing of the document, registering new information on the document into the blockchain service; and
in a case where an error occurs during the printing of the document, not registering the new information on the document into the blockchain service.

13. The non-transitory computer-readable storage medium according to claim 12, wherein the program further includes based on confirming that the information on the document stored in the management service has been registered in the blockchain service, in the printing, the document received from the management service is printed.

\* \* \* \* \*